(12) United States Patent
Jordan, II et al.

(10) Patent No.: US 10,282,788 B1
(45) Date of Patent: May 7, 2019

(54) SYSTEMS AND METHODS FOR MANAGING SERVICE LOG INFORMATION

(71) Applicant: STATE FARM MUTUAL AUTOMOBILE INSURANCE COMPANY, Bloomington, IL (US)

(72) Inventors: Jackie O. Jordan, II, Bloomington, IL (US); John Donovan, Bloomington, IL (US); David Turrentine, Bloomington, IL (US); Torri Wollenschlager, Bloomington, IL (US); Bryan R. Nussbaum, Bloomington, IL (US); Deanna Stockweather, Normal, IL (US); Jeffrey W. Stoiber, Bloomington, IL (US); Kerstin Markwardt, Phoenix, AZ (US); Gail L. Carlson, Bloomington, IL (US); Kyle C. Schiebel, Bloomington, IL (US); Troy Winslow, Bloomington, IL (US); Joseph P. Harr, Bloomington, IL (US); Ellakate Wagner, Bloomington, IL (US); Michael Harris, Jr., Normal, IL (US); Jennylind Sun, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 833 days.

(21) Appl. No.: 14/873,968

(22) Filed: Oct. 2, 2015

Related U.S. Application Data

(60) Provisional application No. 62/220,383, filed on Sep. 18, 2015, provisional application No. 62/201,671, (Continued)

(51) Int. Cl.
*G06Q 40/08* (2012.01)

(52) U.S. Cl.
CPC .................................. *G06Q 40/08* (2013.01)

(58) Field of Classification Search
CPC ........ G06Q 10/00; G06Q 20/00; G06Q 30/00; G06Q 40/00
(Continued)

(56) References Cited

U.S. PATENT DOCUMENTS 3,817,161 A    6/1974  Koplon
3,875,612 A    4/1975  Poitras
(Continued)

FOREIGN PATENT DOCUMENTS

CN    202865924 U       4/2013
WO    WO-2013/076721 A1  5/2013
WO    WO-2014/207558 A2 12/2014

OTHER PUBLICATIONS

U.S. Appl. No. 14/692,864, Nonfinal Office Action, dated May 16, 2017.
(Continued)

*Primary Examiner* — Frantzy Poinvil

(57) ABSTRACT

Methods and systems for processing insurance policies associated with properties may be provided. A home may be populated with smart devices that are connected to, or in communication with, a central (or "smart home") controller, such as via wired or wireless communication. The smart devices are covered by an insurance policy, such as homeowners, renters, or personal articles insurance. The central controller may receive, with customer permission, service log information for the devices, and update an inventory list to include the service log information. The controller may detect that a smart device has been repaired, and then generate and transmit a notification to the customer. In some cases, the notification may prompt the customer to schedule a future repair event. The smart devices may be associated with appliances, electronics, computers, televisions, jewelry,
(Continued)

vehicles, furniture, or other personal belongings. Insurance discounts may be provided based upon the service log/maintenance functionality.

20 Claims, 6 Drawing Sheets

Related U.S. Application Data filed on Aug. 6, 2015, provisional application No. 62/200,375, filed on Aug. 3, 2015, provisional application No. 62/198,813, filed on Jul. 30, 2015, provisional application No. 62/197,343, filed on Jul. 27, 2015, provisional application No. 62/193,317, filed on Jul. 16, 2015, provisional application No. 62/189,329, filed on Jul. 7, 2015, provisional application No. 62/187,651, filed on Jul. 1, 2015, provisional application No. 62/187,624, filed on Jul. 1, 2015, provisional application No. 62/187,642, filed on Jul. 1, 2015, provisional application No. 62/187,666, filed on Jul. 1, 2015, provisional application No. 62/187,645, filed on Jul. 1, 2015, provisional application No. 62/105,407, filed on Jan. 20, 2015, provisional application No. 62/060,962, filed on Oct. 7, 2014.

(58) Field of Classification Search
USPC ..................................................... 705/3–44
See application file for complete search history.

(56) References Cited

U.S. PATENT DOCUMENTS

| | | | |
|---|---|---|---|
| 5,099,751 A | 3/1992 | Newman et al. | |
| 5,128,859 A | 7/1992 | Carbone et al. | |
| 5,554,433 A | 9/1996 | Perrone, Jr. et al. | |
| 5,903,426 A | 5/1999 | Ehling | |
| 6,023,762 A | 2/2000 | Dean et al. | |
| 6,155,324 A | 12/2000 | Elliott et al. | |
| 6,222,455 B1 | 4/2001 | Kaiser | |
| 6,526,807 B1 | 3/2003 | Doumit et al. | |
| 6,812,848 B2 | 11/2004 | Candela | |
| 7,030,767 B2 | 4/2006 | Candela | |
| 7,194,416 B2 | 3/2007 | Provost et al. | |
| 7,309,216 B1 | 12/2007 | Spadola, Jr. et al. | |
| 7,348,882 B2 | 3/2008 | Adamczyk et al. | |
| 7,598,856 B1 | 10/2009 | Nick et al. | |
| 7,715,036 B2 | 5/2010 | Silverbrook et al. | |
| 7,809,587 B2 | 10/2010 | Dorai et al. | |
| 7,813,822 B1 | 10/2010 | Hoffberg | |
| 8,031,079 B2 | 10/2011 | Kates | |
| 8,041,636 B1 | 10/2011 | Hunter et al. | |
| 8,106,769 B1 | 1/2012 | Maroney et al. | |
| 8,108,271 B1 | 1/2012 | Duncan et al. | |
| 8,229,861 B1 | 7/2012 | Trandal et al. | |
| 8,280,633 B1 | 10/2012 | Eldering et al. | |
| 8,289,160 B1 | 10/2012 | Billman | |
| 8,316,237 B1 | 11/2012 | Felsher et al. | |
| 8,400,299 B1 | 3/2013 | Maroney et al. | |
| 8,510,196 B1 | 8/2013 | Brandmaier et al. | |
| 8,527,306 B1 | 9/2013 | Reeser et al. | |
| 8,533,144 B1 | 9/2013 | Reeser et al. | |
| 8,595,034 B2 | 11/2013 | Bauer et al. | |
| 8,596,293 B2 | 12/2013 | Mous et al. | |
| 8,605,209 B2 | 12/2013 | Becker | |
| 8,620,841 B1 | 12/2013 | Filson et al. | |
| 8,621,097 B2 | 12/2013 | Venkatakrishnan et al. | |
| 8,650,048 B1 | 2/2014 | Hopkins, III et al. | |
| 8,694,501 B1 | 4/2014 | Trandal et al. | |
| 8,712,893 B1 | 4/2014 | Brandmaier et al. | |
| 8,730,039 B1 | 5/2014 | Billman | |
| 8,731,975 B2 | 5/2014 | English et al. | |
| 8,749,381 B1 | 6/2014 | Maroney et al. | |
| 9,049,168 B2 | 6/2015 | Jacob et al. | |
| 9,280,252 B1 | 3/2016 | Brandmaier et al. | |
| 9,297,150 B2 | 3/2016 | Klicpera | |
| 9,424,606 B2 | 8/2016 | Wilson, II et al. | |
| 9,429,925 B2 | 8/2016 | Wait | |
| 9,652,976 B2 | 5/2017 | Bruck et al. | |
| 9,654,434 B2 | 5/2017 | Sone et al. | |
| 9,721,399 B2 * | 8/2017 | Ishikawa | G07C 5/0808 |
| 9,824,397 B1 | 11/2017 | Patel et al. | |
| 9,892,463 B1 | 2/2018 | Hakimi-Boushehri et al. | |
| 9,898,912 B1 | 2/2018 | Jordan, II et al. | |
| 2002/0040306 A1 | 4/2002 | Sugiyama et al. | |
| 2004/0054789 A1 | 3/2004 | Breh et al. | |
| 2004/0177032 A1 | 9/2004 | Bradley et al. | |
| 2004/0211228 A1 | 10/2004 | Nishio et al. | |
| 2005/0030175 A1 | 2/2005 | Wolfe | |
| 2005/0080520 A1 | 4/2005 | Kline et al. | |
| 2005/0139420 A1 | 6/2005 | Spoltore et al. | |
| 2005/0251427 A1 | 11/2005 | Dorai et al. | |
| 2005/0275527 A1 | 12/2005 | Kates | |
| 2006/0033625 A1 | 2/2006 | Johnson et al. | |
| 2006/0100912 A1 | 5/2006 | Kumar et al. | |
| 2006/0154642 A1 | 7/2006 | Scannell | |
| 2006/0184379 A1 | 8/2006 | Tan et al. | |
| 2008/0018474 A1 | 1/2008 | Bergman et al. | |
| 2008/0019392 A1 | 1/2008 | Lee | |
| 2008/0184272 A1 | 7/2008 | Brownewell | |
| 2008/0285797 A1 | 11/2008 | Hammadou | |
| 2009/0001891 A1 | 1/2009 | Patterson | |
| 2009/0044595 A1 | 2/2009 | Vokey | |
| 2009/0094129 A1 | 4/2009 | Rhodes et al. | |
| 2009/0243852 A1 | 10/2009 | Haupt et al. | |
| 2009/0259581 A1 | 10/2009 | Horowitz et al. | |
| 2009/0265193 A1 | 10/2009 | Collins et al. | |
| 2010/0073840 A1 | 3/2010 | Hennessey, Jr. | |
| 2010/0235285 A1 | 9/2010 | Hoffberg | |
| 2010/0299217 A1 | 11/2010 | Hui | |
| 2011/0003577 A1 | 1/2011 | Rogalski et al. | |
| 2011/0077875 A1 | 3/2011 | Tran et al. | |
| 2011/0112660 A1 | 5/2011 | Bergmann et al. | |
| 2011/0161117 A1 | 6/2011 | Busque et al. | |
| 2012/0016695 A1 | 1/2012 | Bernard et al. | |
| 2012/0101855 A1 | 4/2012 | Collins et al. | |
| 2012/0116071 A1 * | 5/2012 | Rao | A61K 31/437 |
| | | | 540/457 |
| 2012/0116820 A1 | 5/2012 | English et al. | |
| 2012/0166115 A1 | 6/2012 | Apostolakis | |
| 2012/0188081 A1 | 7/2012 | Van Katwijk | |
| 2012/0265586 A1 | 10/2012 | Mammone | |
| 2012/0290333 A1 | 11/2012 | Birchall | |
| 2012/0290497 A1 * | 11/2012 | Magara | G06Q 10/00 |
| | | | 705/345 |
| 2013/0049950 A1 | 2/2013 | Wohlert | |
| 2013/0096960 A1 | 4/2013 | English et al. | |
| 2013/0107706 A1 * | 5/2013 | Raleigh | H04L 41/0806 |
| | | | 370/230 |
| 2013/0144486 A1 | 6/2013 | Ricci | |
| 2013/0159021 A1 | 6/2013 | Felsher | |
| 2013/0226624 A1 | 8/2013 | Blessman et al. | |
| 2013/0234840 A1 | 9/2013 | Trundle et al. | |
| 2013/0257626 A1 | 10/2013 | Masli et al. | |
| 2013/0290033 A1 | 10/2013 | Reeser et al. | |
| 2014/0122133 A1 | 5/2014 | Weisberg et al. | |
| 2014/0136242 A1 | 5/2014 | Weekes et al. | |
| 2014/0180723 A1 | 6/2014 | Cote et al. | |
| 2014/0201315 A1 | 7/2014 | Jacob et al. | |
| 2014/0201844 A1 | 7/2014 | Buck | |
| 2014/0216071 A1 * | 8/2014 | Broadbent | H04L 67/125 |
| | | | 62/66 |
| 2014/0222329 A1 | 8/2014 | Frey | |
| 2014/0222469 A1 | 8/2014 | Stahl et al. | |
| 2014/0238511 A1 | 8/2014 | Klicpera | |
| 2014/0244997 A1 | 8/2014 | Goel et al. | |
| 2014/0257876 A1 * | 9/2014 | English | H04L 61/2007 |
| | | | 705/4 |
| 2014/0266717 A1 | 9/2014 | Warren et al. | |
| 2014/0278571 A1 | 9/2014 | Mullen et al. | |
| 2014/0303801 A1 | 10/2014 | Ahn et al. | |
| 2014/0340216 A1 | 11/2014 | Puskarich | |

(56) References Cited

U.S. PATENT DOCUMENTS

| | | | |
|---|---|---|---|
| 2014/0358592 | A1 | 12/2014 | Wedig et al. |
| 2014/0379156 | A1 | 12/2014 | Kamel et al. |
| 2015/0154712 | A1 | 6/2015 | Cook |
| 2015/0160636 | A1 | 6/2015 | McCarthy, III et al. |
| 2015/0163412 | A1 | 6/2015 | Holley et al. |
| 2015/0170288 | A1 | 6/2015 | Harton et al. |
| 2015/0206249 | A1 | 7/2015 | Fini |
| 2015/0254940 | A1* | 9/2015 | Graef ............... G07F 19/20 700/242 |
| 2015/0287310 | A1 | 10/2015 | Deliuliis et al. |
| 2015/0332407 | A1 | 11/2015 | Wilson, II et al. |
| 2015/0364028 | A1 | 12/2015 | Child et al. |
| 2016/0018226 | A1 | 1/2016 | Plocher et al. |
| 2016/0042463 | A1 | 2/2016 | Gillespie |
| 2016/0078744 | A1 | 3/2016 | Gieck |
| 2016/0104250 | A1 | 4/2016 | Allen et al. |
| 2016/0323771 | A1* | 11/2016 | Raleigh ............... H04L 41/0806 |
| 2017/0147722 | A1 | 5/2017 | Greenwood |
| 2017/0304659 | A1 | 10/2017 | Chen et al. |

OTHER PUBLICATIONS

U.S. Appl. No. 14/692,946, Nonfinal Office Action, dated Apr. 4, 2017.
U.S. Appl. No. 14/692,961, Nonfinal Office Action, dated Apr. 14, 2017.
U.S. Appl. No. 14/693,021, Nonfinal Office Action, dated Jun. 30, 2017.
U.S. Appl. No. 14/693,034, Nonfinal Office Action, dated May 17, 2017.
U.S. Appl. No. 14/693,039, Nonfinal Office Action, dated Jun. 5, 2017.
U.S. Appl. No. 14/693,057, Nonfinal Office Action, dated Aug. 21, 2017.
U.S. Appl. No. 14/873,823, Final Office Action, dated Mar. 15, 2017.
U.S. Appl. No. 14/873,823, Nonfinal Office Action, dated Jun. 21, 2017.
U.S. Appl. No. 14/873,823, Nonfinal Office Action, dated Nov. 30, 2016.
U.S. Appl. No. 14/692,943, Nonfinal Office Action, dated Sep. 12, 2017.
U.S. Appl. No. 14/692,961, Final Office Action, dated Sep. 1, 2017.
U.S. Appl. No. 14/693,032, Nonfinal Office Action, dated Sep. 7, 2017.
U.S. Appl. No. 14/873,864, Notice of Allowance, dated Aug. 28, 2017.
U.S. Appl. No. 14/873,864, Final Office Action, dated Dec. 2, 2016.
U.S. Appl. No. 14/873,864, Nonfinal Office Action, dated Apr. 5, 2017.
U.S. Appl. No. 14/873,864, Nonfinal Office Action, dated Jul. 14, 2016.
Knutsen, Confusion about causation in insurance: solutions for catastrophic losses, Ala. L. Rev., 5:957-1023 (2010).
U.S. Appl. No. 14/692,864, Final Office Action, dated Nov. 8, 2017.
U.S. Appl. No. 14/692,946, Final Office Action, dated Oct. 30, 2017.
U.S. Appl. No. 14/692,953, Nonfinal Office Action, dated Sep. 19, 2017.
U.S. Appl. No. 14/692,961, Nonfinal Office Action, dated Dec. 28, 2017.
U.S. Appl. No. 14/693,034, Notice of Allowance, dated Oct. 25, 2017.
U.S. Appl. No. 14/693,039, Final Office Action, dated Dec. 15, 2017.
U.S. Appl. No. 14/873,722, Nonfinal Office Action, dated Dec. 5, 2017.
U.S. Appl. No. 14/873,783, Nonfinal Office Action, dated Dec. 8, 2017.
U.S. Appl. No. 14/873,823, Final Office Action, dated Nov. 3, 2017.
U.S. Appl. No. 14/873,864, Notice of Allowance, dated Dec. 21, 2017.
U.S. Appl. No. 14/873,914, Nonfinal Office Action, dated Dec. 26, 2017.
U.S. Appl. No. 14/873,942, Nonfinal Office Action, dated Nov. 22, 2017.
System for Loss Prevention, IP.com, published Nov. 8, 2008.
U.S. Appl. No. 14/692,864, Nonfinal Office Action, dated May 24, 2018.
U.S. Appl. No. 14/692,943, Notice of Allowance, dated May 1, 2018.
U.S. Appl. No. 14/692,946, Nonfinal Office Action, dated Apr. 6, 2018.
U.S. Appl. No. 14/692,953, Final Office Action, dated Apr. 27, 2018.
U.S. Appl. No. 14/692,961, Final Office Action, dated Jun. 20, 2018.
U.S. Appl. No. 14/693,021, Final Office Action, dated Jan. 25, 2018.
U.S. Appl. No. 14/693,032, Final Office Action, dated Mar. 22, 2018.
U.S. Appl. No. 14/693,032, Notice of Allowance, dated Jun. 22, 2018.
U.S. Appl. No. 14/693,039, Nonfinal Office Action, dated May 3, 2018.
U.S. Appl. No. 14/693,057, Final Office Action, dated Feb. 7, 2018.
U.S. Appl. No. 14/873,722, Final Office Action, dated Jun. 15, 2018.
U.S. Appl. No. 14/873,783, Final Office Action, dated May 23, 2018.
U.S. Appl. No. 14/873,823, Final Office Action, dated Jun. 29, 2018.
U.S. Appl. No. 14/873,823, Nonfinal Office Action, dated Feb. 23, 2018.
U.S. Appl. No. 14/873,864, Corrected Notice of Allowability, dated Jan. 18, 2018.
U.S. Appl. No. 14/873,864, Corrected Notice of Allowance, dated Jan. 18, 2018.
U.S. Appl. No. 14/873,942, Nonfinal Office Action, dated Mar. 16, 2018.
U.S. Appl. No. 15/409,248, filed Jan. 18, 2017, Konrardy et al., "Sensor Malfunction Detection".
U.S. Appl. No. 15/409,271, filed Jan. 18, 2017, Konrardy et al., "Autonomous Vehicle Component Malfunction Impact Assessment".
U.S. Appl. No. 15/409,305, Jan. 18, 2017, Konrardy et al., "Component Malfunction Impact Assessment".
U.S. Appl. No. 15/409,318, filed Jan. 18, 2017, Konrardy et al., "Automatic Repair of Autonomous Vehicles".
U.S. Appl. No. 15/409,336, filed Jan. 18, 2017, Konrardy et al., "Automatic Repair of Autonomous Components".
U.S. Appl. No. 15/409,340, filed Jan. 18, 2017, Konrardy et al., "Autonomous Vehicle Damage and Salvage Assessment".
U.S. Appl. No. 15/409,349, filed Jan. 18, 2017, Konrardy et al., "Component Damage and Salvage Assessment".
U.S. Appl. No. 15/409,359, filed Jan. 18, 2017, Konrardy et al., "Detecting and Responding to Autonomous Vehicle Collisions".
U.S. Appl. No. 15/409,371, filed Jan. 18, 2017, Konrardy et al., "Detecting and Responding to Autonomous Environment Incidents".
U.S. Appl. No. 15/409,445, filed Jan. 18, 2017, Konrardy et al., "Virtual Testing of Autonomous Vehicle Control System".
U.S. Appl. No. 15/409,473, filed Jan. 18, 2017, Konrardy et al., "Virtual Testing of Autonomous Environment Control System".
U.S. Appl. No. 15/859,859, filed Jan. 2, 2018, Hakmi-Boushehri et al., "Systems and Methods for Community-Based Cause of Loss Determination".
U.S. Appl. No. 15/895,149, filed Feb. 13, 2018, Jordan et al., Systems and Methods for Automatically Generating an Escape Route.

* cited by examiner

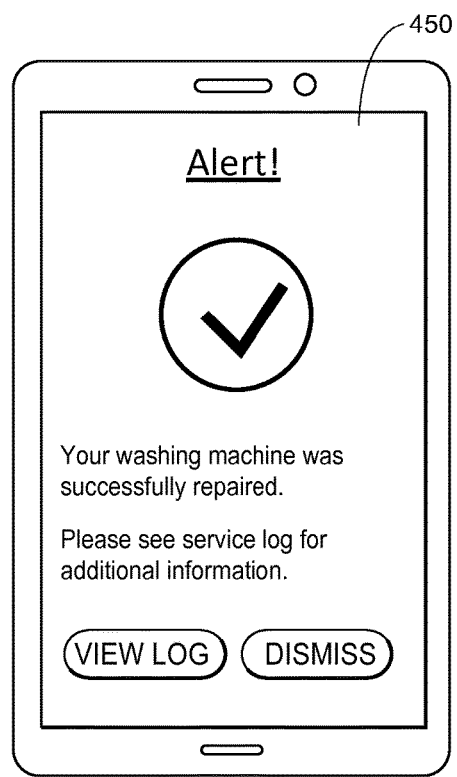
FIG. 4A  FIG. 4B

SYSTEMS AND METHODS FOR MANAGING SERVICE LOG INFORMATION

CROSS-REFERENCE TO RELATED APPLICATIONS

This application claims benefit of the filing date of U.S. Provisional Patent Application Nos. 62/060,962 (filed Oct. 7, 2014, and entitled "SYSTEMS AND METHODS FOR MANAGING DEVICES WITHIN A CONNECTED PROPERTY AND INSURANCE POLICIES ASSOCIATED THEREWITH"); 62/105,407 (filed Jan. 20, 2015, and entitled "SYSTEMS AND METHODS FOR MANAGING DEVICES WITHIN A CONNECTED PROPERTY AND INSURANCE POLICIES ASSOCIATED THEREWITH"); 62/187,624 (filed Jul. 1, 2015, and entitled "SYSTEMS AND METHODS FOR FACILITATING DEVICE REPLACEMENT WITHIN A CONNECTED PROPERTY"); 62/187,645 (filed Jul. 1, 2015, and entitled "SYSTEMS AND METHODS FOR MANAGING BUILDING CODE COMPLIANCE FOR A PROPERTY"); 62/187,651 (filed Jul. 1, 2015, and entitled "SYSTEMS AND METHODS FOR AUTOMATICALLY GENERATING AN ESCAPE ROUTE"); 62/187,642 (filed Jul. 1, 2015, and entitled "SYSTEMS AND METHODS FOR ANALYZING SENSOR DATA TO DETECT PROPERTY INTRUSION EVENTS"); 62/187,666 (filed Jul. 1, 2015, and entitled "SYSTEMS AND METHODS FOR IMPROVED ASSISTED OR INDEPENDENT LIVING ENVIRONMENTS"); 62/189,329 (filed Jul. 7, 2015, and entitled "SYSTEMS AND METHODS FOR MANAGING WARRANTY INFORMATION ASSOCIATED WITH DEVICES POPULATED WITHIN A PROPERTY"); 62/193,317 (filed Jul. 16, 2015, and entitled "SYSTEMS AND METHODS FOR MANAGING SMART DEVICES BASED UPON ELECTRICAL USAGE DATA"); 62/197,343 (filed Jul. 27, 2015, and entitled "SYSTEMS AND METHODS FOR CONTROLLING SMART DEVICES BASED UPON IMAGE DATA FROM IMAGE SENSORS"); 62/198,813 (filed Jul. 30, 2015, and entitled "SYSTEMS AND METHODS FOR MANAGING SERVICE LOG INFORMATION"); 62/200,375 (filed Aug. 3, 2015, and entitled "SYSTEMS AND METHODS FOR AUTOMATICALLY RESPONDING TO A FIRE"); 62/201,671 (filed Aug. 6, 2015, and entitled "SYSTEMS AND METHODS FOR AUTOMATICALLY MITIGATING RISK OF DAMAGE FROM BROKEN CIRCUITS"); 62/220,383 (filed Sep. 18, 2015, and entitled "METHODS AND SYSTEMS FOR RESPONDING TO A BROKEN CIRCUIT")—which are all hereby incorporated by reference in their entireties.

FIELD OF THE DISCLOSURE

The present disclosure generally relates to managing service log information associated with devices within properties. More particularly, the present disclosure may relate to updating, with repair information, inventory lists of smart devices within properties, and managing insurance policies associated therewith.

BACKGROUND

Homeowner and personal property insurance exists to provide financial protection against damage to the home, as well as personal property owned by the policyholder, respectively. With the proliferation of the "internet of things," more household devices and items are gaining communication and network connectivity capabilities. The new capabilities may enable data detection and more accurate information and metrics. However, current insurance policy processing systems may not account for the connected devices and/or improved information.

SUMMARY

The present embodiments may, inter alia, facilitate communications with connected devices and items, and/or facilitate insurance processing associated with the connected devices and items, among other functionalities. For instance, the present embodiments may dynamically manage insurance policies associated with a property (e.g., smart home) that may be populated with a plurality of devices. Each of the plurality of devices may be configured to monitor various conditions of the property (including those that indicate a need for repair). A controller may interface with the plurality of devices to receive and monitor sensor data from the plurality of devices, as well as determine that at least one of the plurality of devices have recently been repaired. The controller may also determine an outcome of a repair event and update a service log accordingly. The controller and/or an insurance provider may generate a notification about the repair event so that the customer may be afforded an effective and efficient channel for ensuring device operability without having to manually monitor device performance.

In one aspect, a computer-implemented method of managing an insurance policy associated with a property may be provided. The property may be populated with a hardware controller (e.g., a smart home controller) in communication with the plurality of devices and each of the plurality of devices may be respectively covered by a warranty. The method may include, with customer permission or consent, (1) receiving, by the hardware controller via a first communication network, an indication that a particular device of the plurality of devices has undergone a repair event; (2) accessing, by one or more processors, an inventory list associated with the property, the inventory list indicating the plurality of devices and including a service log for each of the plurality of devices, wherein the service log indicates at least one of a set of past repair events and/or a set of future scheduled repair events for the respective device of the plurality of devices; (3) based upon the indication, updating, by the one or more processors, the service log associated with the particular device to indicate that the particular device has undergone the repair event; (4) generating, by the one or more processors, a notification including a description of the repair event; and/or (5) transmitting, to a customer associated with the insurance policy via a second communication network, the notification to facilitate customer awareness of the repair event. The method may include additional, less, or alternate actions, including those discussed elsewhere herein.

In another aspect, a system for managing an insurance policy associated with a property may be provided. The property may be populated with a hardware controller in communication with the plurality of devices and each of the plurality of devices respectively may be covered by a warranty. The system may include (i) a plurality of transceivers adapted to communicate data; (ii) a memory adapted to store non-transitory computer executable instructions; and/or (iii) one or more processors adapted to interface with the plurality of transceivers. The one or more processors may be configured to execute the non-transitory computer executable instructions to cause the system to, with customer permission, (1) receive, at the plurality of transceivers, an indication that a particular device of the plurality of devices has undergone a repair event; (2) access, by the one or more processors, an inventory list associated with the property, the inventory list indicating the plurality of devices and including a service log for each of the plurality of devices, wherein the service log indicates at least one of a set of past repair events and/or a set of future scheduled repair events for the respective device of the plurality of devices; (3) based upon the indication, update, by the one or more processors, the service log associated with the particular device to indicate that the particular device has undergone the repair event; (4) generate, by the one or more processors, a notification including a description of the repair event; and/or (5) transmit, to a customer associated with the insurance policy via the plurality of transceivers, the notification to facilitate customer awareness of the repair event. The system may include additional, less, or alternate functionality, including that discussed elsewhere herein.

In another aspect, a non-transitory computer-readable storage medium storing processor-executable instructions may be provided. When executed, the instructions may cause one or more processors to, with customer consent (1) receive, by one or more processors, an indication that a particular device of the plurality of devices has undergone a repair event; (2) access, by the one or more processors, an inventory list associated with the property, the inventory list indicating the plurality of devices and including a service log for each of the plurality of devices, wherein the service log indicates at least one of a set of past repair events and/or a set of future scheduled repair events for the respective device of the plurality of devices; (3) based upon the indication, update, by the one or more processors, the service log associated with the particular device to indicate that the particular device has undergone the repair event; (4) generate, by the one or more processors, a notification including a description of the repair event; and/or (5) transmit, to a customer associated with the insurance policy via a remote communication network, the notification to facilitate customer awareness of the repair event. The instructions may cause additional, less, or alternate functionality, including that discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIGS. 4A and 4B depict exemplary interfaces associated with alerting a customer to the outcome of a repair event, in accordance with some embodiments;

DETAILED DESCRIPTION

Figure 1:
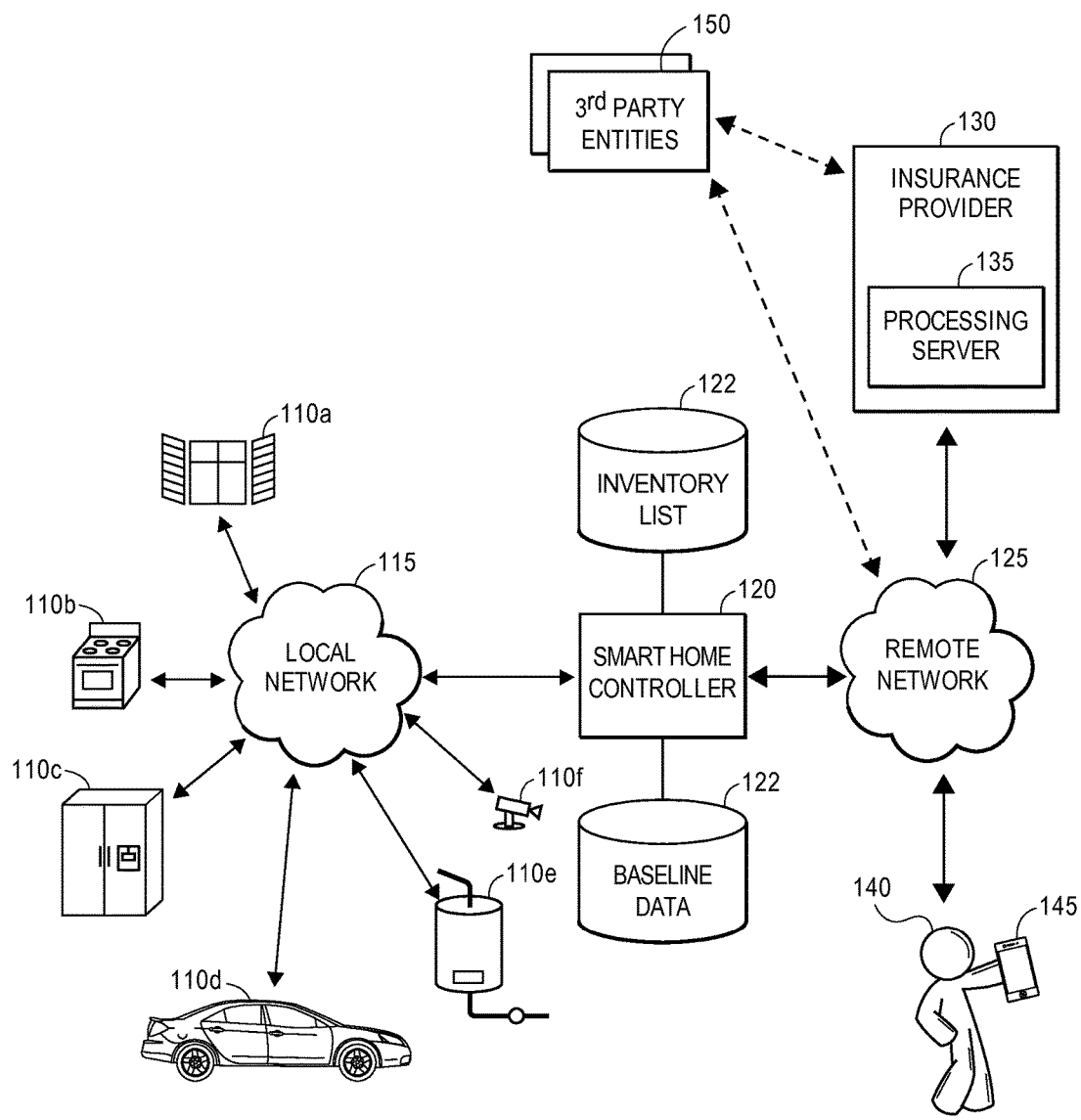
FIG. 1 depicts an exemplary environment including components and entities associated with retrieving and compiling device data and facilitating insurance processing associated therewith, in accordance with some embodiments.

The present embodiments may relate to, inter alia, managing insurance processing related to personal property within a home or other type of property, such as household furniture, appliances, electronics, vehicles (e.g., cars, boats, motorcycles), and/or other personal belongings (e.g., clothing, jewelry, antiques). The personal property, which may include structural components of the property itself, may be repaired during a repair event. The present embodiments may also relate to (a) providing and updating insurance policies; (b) the maintaining and monitoring of repair information; (c) the facilitation of repairing devices in need of repair; (d) modifying insurance policies; (e) preventing or mitigating home damage; and/or (f) other insurance-related activities.

In one aspect, a property may have a "smart" central controller that may be wirelessly connected, or connected via hard-wire, with various household related items, devices, and/or sensors. The central controller (or smart home controller) may be associated with any type of property, such as homes, office buildings, restaurants, farms, and/or other types of properties. The central controller may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (and/or sensor associated therewith), as well as the central controller, may be equipped with a processor, memory unit, software applications, wireless transceivers, local power supply, various types of sensors, and/or other components.

The smart devices may be included on an electronic or other inventory list associated with the property. The inventory list may include service and/or repair information. As used generally herein, the phrase "service log" may refer to the compilation of service and/or repair information. In some embodiments, the service log may include a description of past repair events and/or indications describing future scheduled repair events. It should be understood that despite the use of the word "future," times associated with the scheduled repair event may actually refer to the past, for example, when a repair service provider is late and/or currently working on the repair. The service log may be manually entered by a user or automatically determined based upon various factors. In some embodiments, the smart devices themselves may store and/or monitor the repair information, such as in a data tag or other type of storage or memory unit.

In particular, according to some embodiments, the repair log information may include an identity of the smart device, a location of the smart device, a time at which the repair events occurred, an identity of an entity performing the repair event, an indication of a component that was repaired during the repair event, and/or the like. The central controller may include in the inventory list an additional data entry and/or column corresponding to each different type and/or category of repair information. In some embodiments, the repair log may be accessible by remote electronic devices associated with a policyholder, such as, smart phones, tablets, computers, etc.

The central controller may remotely gather data from the smart devices (or sensors associated therewith) dispersed around or otherwise interconnected within the property. The central controller may analyze the data and automatically determine that a smart device was repaired during a repair event. Additionally, the central controller may analyze the data and automatically determine that a smart device is in need of additional repair. In particular, the data gathered from the smart devices may include a plurality of operational parameters that describe the performance of the smart devices (e.g., a pressure, a current reading, a temperature, etc.). As part of the analysis, the operational data may be compared to baseline data indicative of normal device operation. In some embodiments, the baseline data may be stored in the service log and/or stored by another storage unit accessible by the central controller. After analyzing the data, the central controller may determine that current operational parameters indicate that the smart device is in need of further repair and/or that a repair was unsuccessful. The central controller may transmit a notification and/or request to the customer indicating the results of the analysis.

The systems and methods discussed herein address a challenge that is particular to insurance processing. In particular, the challenge relates to a difficulty in assessing or identifying connected components or devices that may be included in a property insurance policy, and determining whether they are functioning properly, thereby lowering the risk of property damage. This is particularly apparent when defects to the components are undetectable by a policyholder. In particular, many policyholders blindly trust repair service providers to properly repair components. However, components may remain defective even after a repair event and/or other components may have been damaged during the repair event. The resulting property insurance policy, therefore, often inaccurately accounts for the risk of component failure. Conventional solutions may rely upon the policyholder or an agent of the insurance provider to manually inspect the components and any corresponding information relevant to the insurance provider in an attempt to compile an accurate listing of components operation. Since the policyholder may lack the knowledge to make an accurate assessment, these components may continue faulty operation unbeknownst to the policyholder and/or insurance provider. Moreover, some repair service providers performing a repair event may be less than forthcoming in describing any failures and/or further damage caused during the repair event.

In contrast, the systems and methods of the present embodiments dynamically detect the presence of components as well as the corresponding repair and/or operational information to ensure that the status of these components is known by relevant parties, as well as to more accurately price insurance policies associated therewith. Therefore, because the systems and methods of the present embodiments employ dynamic detection of connected devices and components within a property, the systems and methods are necessarily rooted in computer technology in order to overcome the noted shortcomings that specifically arise in the realm of insurance processing. It should be understood that overcoming these shortcomings through the dynamic analysis does not rely solely on the inherent speed and/or efficiency of computing devices, but additionally, the computing devices' ability to obtain more accurate and comprehensive information than conventionally possible.

Similarly, the systems and methods of the present embodiments provide improvements in a technical field, namely, home automation. Instead of the systems and methods merely being performed by hardware components using basic functions, the systems and methods of the present embodiments employ complex steps that go beyond the mere concept of simply retrieving and combining data using a computer. In particular, the hardware components detect connected devices, update an inventory list including the connected device, determine whether devices were repaired successfully, dynamically modify an insurance policy (or premium or discount) associated with the connected devices, generate repair requests, and alert the policyholder and/or insurance provider about any success or failure of repair events, among other functionalities. This combination of elements impose meaningful limits in that the operations are applied to improve home automation by ensuring that connected devices are included in an insurance policy and/or that the insurance policy accurately reflects the amount of liability associated with the connected devices, and by facilitating and/or enabling the modification of insurance policies.

Generally, the information gathered by the central controller from the various smart devices and/or sensors disbursed around the property may be utilized for insurance purposes. The information may be used to process or manage insurance covering the home, residence or apartment, personal belongings, vehicles, etc. The systems and methods therefore offer a benefit to customers by automatically alerting the customer about potential unsafe conditions caused by defective smart devices and provide systems and methods to automatically remedy the situation. These features reduce the need for customers to manually assess property value, and/or manually track and/or maintain the performance of smart devices both before and after repair events. Further, as a result of the automatic monitoring of the repair statuses, insurance providers may experience a reduction in the amount of processing and modifications necessary to process the claims associated therewith. Moreover, by implementing the systems and methods, insurance providers may stand out as a cost-effective insurance provider, thereby retaining existing customers and attracting new customers. It should be appreciated that further benefits to the systems and methods are envisioned.

I. Exemplary Environment and Components for Managing Insurance Policies

FIG. 1 depicts an exemplary environment 100 including components and entities for managing devices associated with a property and processing insurance policies associated therewith. Although FIG. 1 depicts certain entities, components, and devices, it should be appreciated that additional or alternate entities and components are envisioned.

As illustrated in FIG. 1, the environment 100 may include a plurality of smart devices 110 that may be each connected to a local communication network 115. As shown in FIG. 1, the plurality of smart devices 110 may include smart window shutters 110a, a smart oven 110b, a smart refrigerator 110c, a smart vehicle 110d, a smart water supply 110e, and/or a smart surveillance camera 110f. Each of the plurality of devices 110 may be located within or proximate to the property (generally, "on premises"). Although FIG. 1 depicts six smart devices in the environment 100, it should be appreciated that additional or fewer smart devices may be present in other embodiments. In some cases, the smart devices may be purchased from the manufacturer with the "smart" functionally incorporated therein. In other cases, the smart devices may have been purchased as "dumb" devices and subsequently modified to add the "smart" functionality to the device. For example, a homeowner may install a motor system on window shutters that is capable of transmitting the open/close status of the shutters and/or remotely receiving instructions to open or close the shutters. As another example, when a vehicle owner enrolls in a usage-based vehicle insurance policy, the vehicle owner may be provided a smart device that is able to monitor the miles driven by the vehicle and, upon returning to the home, the smart device may communicate the number of miles driven since previously departing.

The plurality of devices 110 may be configured to communicate with a controller 120 via the local communication network 115. The local communication network 115 may facilitate any type of data communication between devices and controllers located on the premises of the property via any standard or technology (e.g., LAN, WLAN, any IEEE 802 standard including Ethernet, and/or others). The local communication network 115 may further support various short-range communication protocols such as Bluetooth®, Bluetooth® Low Energy, near field communication (NFC), radio-frequency identification (RFID), and/or other types of short-range protocols.

According to aspects, the plurality of devices 110 may transmit, to the controller 120 via the local communication network 115, sensor data, including repair and/or operational information, gathered from sensors associated with the plurality of devices 110. The sensor data may be audio data, image or video data, status data, and/or other data or information. For example, the sensor data may indicate that a repair service provider recently performed a repair; the current flow through a wiring component; the amount of water flowing through a pipe; and/or other information pertinent to an operation state or status of the plurality of devices 110. The sensor data may include a timestamp representing the time that the sensor data was recorded. According to some embodiments, the plurality of devices 110 themselves may detect that one of the plurality of devices 110 was repaired. In these embodiments, the repair information transmitted to the controller 120 may include indications characterizing the repair event (e.g., when the repair occurred, what was repaired, etc.).

In some cases, the plurality of devices 110 may also transmit, to the controller 120, various data and information associated with a value of the plurality of devices 110. In particular, the data and information may include various costs and prices associated with the plurality of devices 110. For example, a washing machine may include a component such as a data tag that stores a retail price of the washing machine, a replacement costs of various parts of (or the entirety of) the washing machine, a renewal cost for a warranty associated with the washing machine, and/or a cost of an extended warranty. Additionally, the data component may store maintenance requirements, such as a need to be inspected every five years. The various data and information may be programmable and updatable by an individual manually and/or automatically by the controller 120.

The controller 120 may be coupled to an inventory list database 122 and a baseline database 124. Although FIG. 1 depicts the database 122 and/or database 124 as coupled to the controller 120, it is envisioned that the database 122 and/or the database 124 may be maintained in the "cloud" such that any element of the environment 100 capable of communicating over either the local network 115 or one or more remote networks 125 may directly interact with the data stored therein. In some embodiments, the inventory list database 122 may maintain an inventory list that may include the plurality of devices 110 as well as various data and information associated with the plurality of devices 110 (e.g., the repair information comprising a service log, pricing information, etc.). Similarly, the baseline database 124 may store and/or maintain a plurality of baseline operating conditions corresponding to the plurality of devices 110. The database 122 and/or the database 124 may be organized based upon an identification of the individual device of the plurality of device 110 that the underlying data represents.

The controller 120 may be configured to communicate with other components and entities, such as an insurance provider 130 and/or the $3^{rd}$ party entities 150 via the remote network(s) 125. According to embodiments, the remote network(s) 125 may facilitate any data communication between the controller 120 located on the property and entities or individuals remote to the property via any standard or technology (e.g., GSM, CDMA, TDMA, WCDMA, LTE, EDGE, OFDM, GPRS, EV-DO, UWB, IEEE 802 including Ethernet, WiMAX, and/or others). In some cases, both the local network 115 and the remote network 125(s) may utilize the same technology and/or be considered the same network.

Generally, the insurance provider 130 may be any individual, group of individuals, company, corporation, or other type of entity that may issue insurance policies for customers, such as a homeowners, renters, or personal articles insurance policy associated with the property and/or an insured. According to the present embodiments, the insurance provider 130 may include one or more processing servers 135 configured to facilitate the functionalities as discussed herein. Although FIG. 1 depicts the processing server 135 as a part of the insurance provider 130, it should be appreciated that the processing server 135 may be separate from (and connected to or accessible by) the insurance provider 130. Further, although the present disclosure describes the systems and methods as being facilitated in part by the insurance provider 130, it should be appreciated that other non-insurance related entities may implement the systems and methods.

For example, a general contractor may aggregate service logs across many properties to determine common factors between devices that fail to be repaired properly and/or tend to need repaired at a disproportionate frequency. This aggregated data may enable the general contractor to determine, for example, whether a particular team of contractors and/or brand of devices are more frequently associated with failed repairs, and, as a result, adjust their deployment, training, and/or supply chain strategies accordingly. Thus, it may not be necessary for the property to have an associated insurance policy for the property owners to enjoy the benefits of the systems and methods.

Generally, the controller 120 may be configured to facilitate various insurance-related processing associated with insurance policies for the property 105. In one aspect, the controller 120 may update a total value of the devices 110 and/or determine any corresponding adjustments to an insurance policy for the devices 110 based upon an outcome of a repair event. In another aspect, the controller 120 may compare the total value of the devices to a maximum coverage associated with the property and/or devices 110 to determine whether the insured maintains an appropriate amount of insurance coverage. The controller 120 may communicate any generated or determined information to the insurance provider 130 (and vice-versa) via the remote network(s) 125 to facilitate the insurance-related processing.

The controller 120 may also be in communication, via the remote network(s) 125, with an electronic device 145 associated with an individual 140. In some embodiments, the individual 140 may have an insurance policy (e.g., a home insurance policy, a renter's insurance policy) for the property or a portion thereof, or may otherwise be associated with the property (e.g., the individual 140 may live in the property). The electronic device 145 may be a smartphone, a desktop computer, a laptop, a tablet, a phablet, a smart watch, smart glasses, smart contact lenses, wearable electronic device, or any other electronic or computing device. According to some embodiments, the controller 120 may transmit, via the remote network(s) 125 to the electronic device 145, a notification that a repair event was performed as well as an outcome thereof. The notification may cause the electronic device 145 to present an interface that enables the individual 140 to view the outcome and/or any additional informal descriptive of the repair event. In some embodiments, the controller 120 may transmit, via the network(s) 125 to the electronic device 145, a warning that the repair event was unsuccessful and present an interface that enables the individual 140 to select a desired response to unsuccessful repair event.

The electronic device 145 may transmit, via the remote network(s) 125, an indication of the desired response to the controller 120. In response, the controller 120 may facilitate any processing of the desired response with the processing server 135 of the insurance provider 130. In some implementations, the processing server 135 may facilitate the desired response and processing directly with the customer 140. In some embodiments, the controller 120 may also transmit any modifications to the value of the devices 110 based upon detecting the need for further repair and/or the successful repair event. In response, the homeowner 140 may modify or otherwise alter the insurance policy associated with the property, devices 110, and/or the individual 140.

Additionally, the controller 120 and/or the processing server 135 may be in communication with the $3^{rd}$ party entities 150. According to some embodiments, the $3^{rd}$ party entities 150 may comprise a plurality of repair service providers capable of repairing the plurality of devices 110. When the controller 120 determines that a repair event was unsuccessful and/or that one of the plurality of devices 110 is in need of further repair, the controller 120 and/or the processing server 135 may communicate with the $3^{rd}$ party entities 150 to determine a preferred repair service provider based on, inter alia, capabilities, price, availability, contractual and/or personal relationships, and/or any other factor related to selecting a preferred repair service provider. In some embodiments, one of the $3^{rd}$ party entities 150 may subcontract the performance of a repair event to an alternative one of the $3^{rd}$ party entities 150. The exemplary environment may include additional, less, or alternate components.

Figure 2:
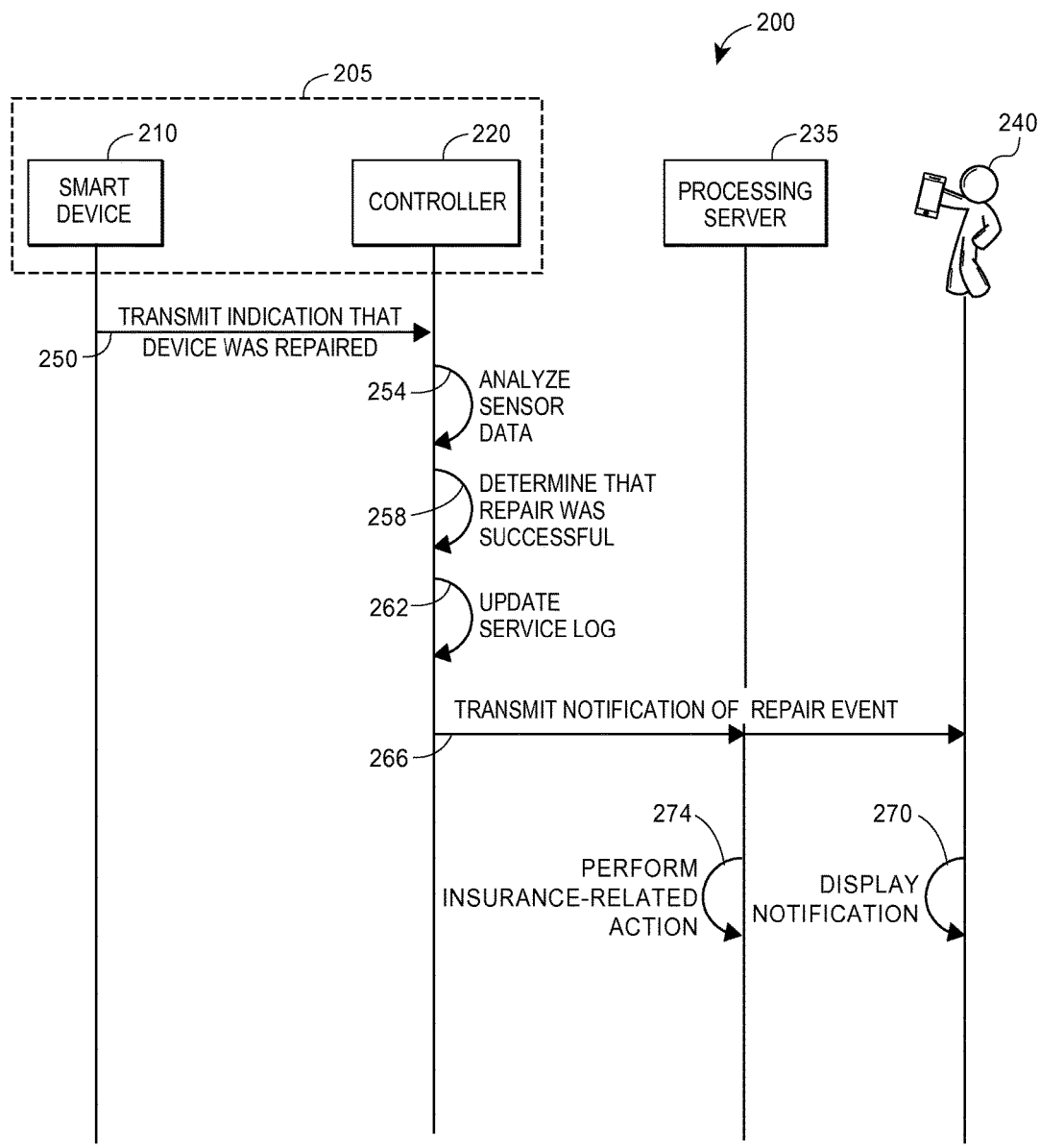
FIG. 2 depicts an exemplary signal diagram associated with determining that a smart device was successfully repaired, in accordance with some embodiments.

II. Exemplary Communication Flows for Modifying Insurance Policies Based Upon Device Repair Referring to FIG. 2, illustrated is an exemplary signal diagram 200 associated with determining that a smart device was successfully repaired. In particular, FIG. 2 may include a smart device 210 (such as any particular device of the plurality of devices 110 as described with respect to FIG. 1), a controller 220 (such as the controller 120 as described with respect to FIG. 1 or a smart home controller), a processing server 235 (such as the processing server 135 as described with respect to FIG. 1 and/or other remote server) that may be associated with an insurance provider, and/or a customer 240 (such as the customer 140 as described with respect to FIG. 1). The customer 240 may have an associated electronic device capable of communication with the other components, such as the electronic or mobile device 145 as described with respect to FIG. 1. Further, the customer 240 may be the policyholder for (or have access to) an insurance policy issued by the insurance provider and associated with the property 205. For example, the customer 240 may have a homeowners or personal articles insurance policy that covers damage or destruction to the smart device 210. It should be appreciated that the smart device 210 is populated on the premises of property 205.

The signal diagram 200 may begin when the smart device 210 transmits (250) an indication that the smart device 210 has been repaired and/or has undergone a repair event to the controller 220. The indication may include a description of a repair event in which the smart device 210 was repaired and/or sensor data indicative of the operational state of the smart device 210. The description of the repair event may include an identity of the smart device 210, a location of the smart device 210, a time the repair event occurred, an identity of an entity performing the repair event (e.g., a repair service provider), an indication of a component of the smart device 210 that was repaired during the repair event, and/or other information as described elsewhere herein. According to certain aspects, the smart device 210 may communicate the indication that the smart device 210 has been repaired via a local network. In other aspects, a user may interface with the controller 220 to manually input the description of the repair event.

Upon receiving the indication that the smart device 210 has been repaired, the controller 220 may analyze (254) any sensor data included in the indication to determine an outcome of the repair event. In particular, the controller 220 may extract an identifier of the smart device 210 from the indication to query a baseline database (such as the baseline database 124 as described with respect to FIG. 1). The baseline database may store information detailing normal device operation for the smart device 210. In some embodiments, the stored information may be derived based upon past performance of the smart device 210 and/or an expected performance of devices of the same type as the smart device 210. To perform the analysis, the controller 220 may compare the received sensor data to said baseline data. It is understood that the compared sensor data and baseline data should describe the same operational state and/or condition of the smart device 210. In some embodiments, the specific parameters contained in the received sensor data share a common name and/or label with the parameters stored in the baseline database (e.g., both may use WTR_PRESSR_V1 to name the parameter describing a water pressure at a particular valve of the smart device 210). In other embodiments, the controller 220 and/or the baseline database may contain a translation and/or lookup table that relates differently named parameters describing the same operational state.

Additionally, the baseline database and/or controller 220 may associate each parameter stored in the baseline database with an allowable range of values. In an exemplary embodiment wherein the smart device 210 is a washing machine, the baseline database may store parameters describing, inter alia, a torque output of an agitator and a resting water flow through a hose. It should be understood that the allowable range may vary between parameters (e.g., the agitator torque may have a range of 16,000 N·m±2,000 N·m and the resting water flow may have a range of 0.01 gpm±0.01 gpm).

According to aspects, when the controller 220 receives the indication from the smart device 210, the controller 220 obtains and/or extracts, from the indication, an identity of the components repaired during the repair event. Based upon the identity of these components, the controller 220 may generate a set of parameters indicative of whether the repair event successfully repaired these components during the repair event. For each parameter of the set of parameters, the controller 220 may compare the value from the received sensor data to the allowable range of the equivalent value stored in the baseline database. The controller 220 may perform this comparison for each of the set of parameters. When the values for all and/or substantially all of received sensor data are within the corresponding allowable ranges indicated by the baseline database, the controller 220 may determine (258) that the repair event was successful and/or that the smart device 210 has undergone a successful repair event.

It should be understood that one or more parameters fail the comparison between the sensor data and the baseline database during a successful repair event. For example, in some scenarios, the smart device 210 may have several faulty components and the repair event was only intended to repair a subset of the faulty components. If the parameter that failed the comparison is influenced and/or determined by a faulty component that was not repaired during the repair event, then it may not be determinative of the success of the repair event. To this end, in determining whether a repair event was successful, the controller 220 may also query a service log associated with the smart device 210 to determine if there are any future scheduled repair events for the smart device 210. Any parameters within the set of parameters that are determined by components that will be repaired during a future scheduled repair event may be ignored and/or excluded when determining the success of a repair event.

Similarly, if all of the parameters within the set of parameters pass the comparison between the sensor data and the baseline database, the repair event still may not actually have been successful. In some scenarios, a repair service provider may have damaged other components of the smart device 210 during the repair event. To this end, the controller 220 may additionally spot check parameters outside of the set of parameters that are indicative of whether other components of the smart device 210 may have been damaged during the repair event. If a parameter subject to the spot check fails the comparison, then the repair event may not have been successful.

Upon the controller 220 determining that the repair event was successful, the controller 220 may then update (262) a service log associated with the smart device 210 in an inventory list database (such as the database 122 as described with respect to FIG. 1). In particular, the controller 220 may create and/or store a new past repair event in the service log associated with the smart device 210 to indicate that the repair event was successful. The new past repair event may include a description of the repair event indicated by the smart device 210. This description may indicate an identity of the smart device 210, a location of the smart device 210, a time the repair event occurred, an identity of an entity performing the repair event, an indication of a component that was repaired during the repair event, an outcome of the repair event, and/or other indications describing the repair event. In some cases the description may be determined based upon the indication received from the smart device 210 and/or a corresponding future scheduled repair event in the service log. In some embodiments, the controller 220 may delete and/or otherwise remove from the service log the future scheduled repair event corresponding to the new past repair event. In this regard, the inventory list may include an up-to-date listing of all smart devices within the property 205 and the corresponding service logs associated therewith.

Additionally, the controller 220 may transmit (266) a notification describing the repair event to the electronic device associated with the customer 240. In response to receiving the notification, the electronic device may present an interface that displays (270) a description of the repair event, including the outcome. The interface may further enable the customer 240 to view any other details of the repair event stored in the service log. In some embodiments, these details may be provided as part of the notification. In some other embodiments, the electronic device may query, via communication with the controller 220 and/or directly with the inventory list database, the service log upon receiving an input from the customer 240.

The controller 220 may also transmit (266) a notification describing the repair event to the processing server 235. In some embodiments, this notification may be the same and/or substantially the same notification transmitted to the customer 240. In response to receiving the notification, the processing server 235 may perform (274) an insurance-related action. For example, the insurance provider associated with the processing server 235 may have previously altered an insurance policy covering the customer 240 and/or the smart device 210 to reflect the risks associated with the need for the smart device 210 to be repaired. As another example, the processing server 235 may have determined that the value of the smart device 210 has decreased based upon the need for repair. Upon the successful repair of the smart device 210, the processing server 235 may determine that these previous risks and/or decreases in value are no longer applicable and update and/or alter the insurance policy accordingly. Similarly, the insurance provider may offer incentives to the customer 240 to utilize the present systems and methods. Accordingly, the processing server 235 may apply any such incentives to the insurance policy. It should be appreciated that signal diagram 200 may include additional, fewer, and/or alternative actions, including those discussed elsewhere herein. For example, in some embodiments, some of the actions described with respect to the controller 220 may be alternatively performed by the processing server 235 and/or the smart device 210.

Figure 3:
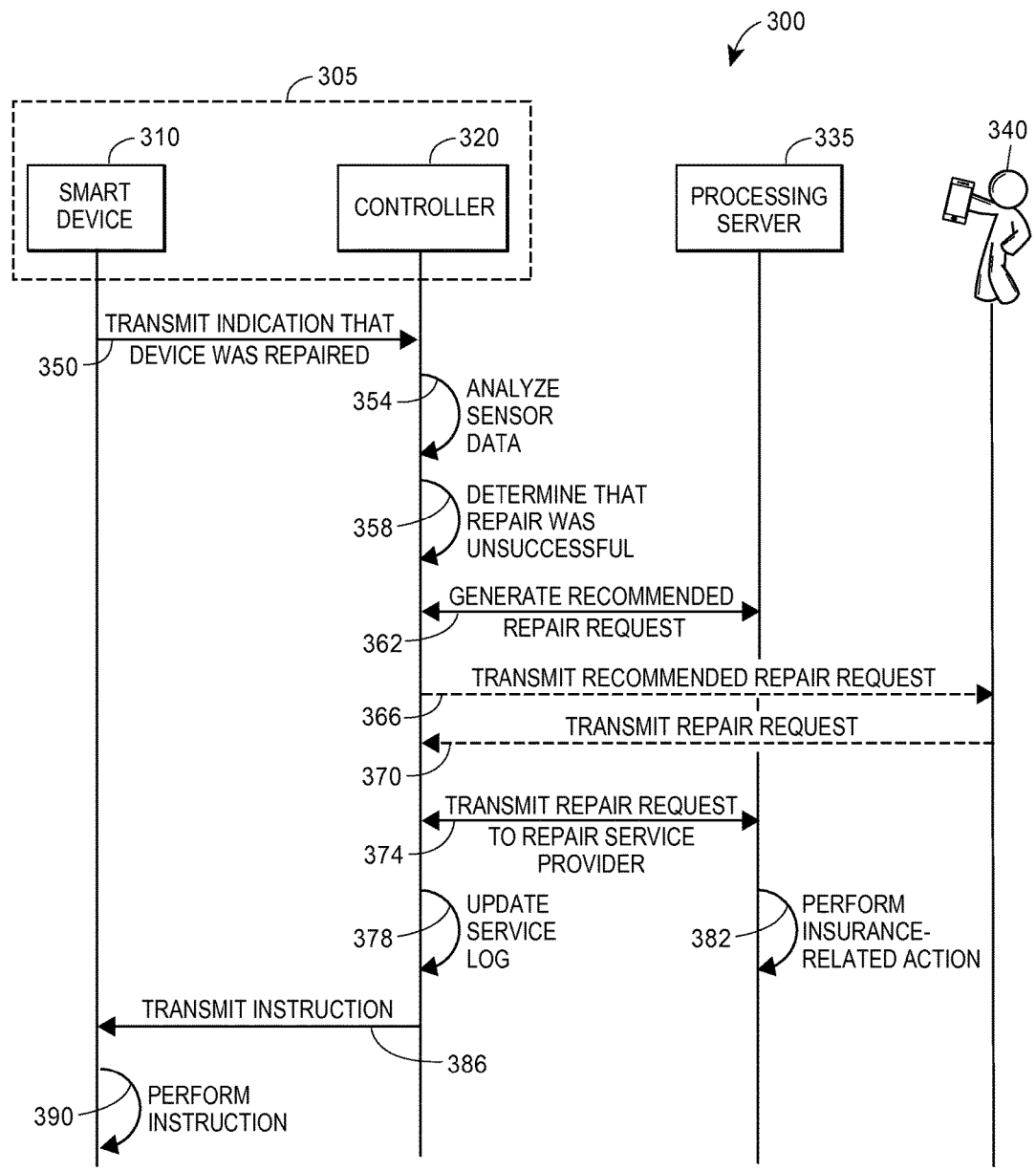
FIG. 3 depicts an exemplary signal diagram associated with determining that a smart device was not successfully repaired, in accordance with some embodiments.

Referring now to FIG. 3, illustrated is an exemplary signal diagram 300 associated with determining that a smart device was not successfully repaired. In particular, FIG. 3 may include a smart device 310 (such as any particular device of the plurality of devices 110 as described with respect to FIG. 1), a controller 320 (such as the controller 120 as described with respect to FIG. 1 or a smart home controller), a processing server 335 (such as the processing server 135 as described with respect to FIG. 1 and/or other remote server) that may be associated with an insurance provider, and/or a customer 340 (such as the customer 140 as described with respect to FIG. 1). The customer 340 may have an associated electronic device capable of communication with the other components, such as the electronic or mobile device 145 as described with respect to FIG. 1. Further, the customer 340 may be the policyholder for (or have access to) an insurance policy issued by the insurance provider and associated with the property 205. For example, the customer 340 may have a homeowners or personal articles insurance policy that covers damage or destruction to the smart device 210. It should be appreciated that the smart device 310 may be populated on the premises of property 305.

The signal diagram 300 may begin when the smart device 310 transmits (350) an indication that the smart device 310 has been repaired and/or has undergone a repair event to the controller 320. In response, the controller 320 may analyze (354) any sensor data included in the indication to determine whether or not the repair was successful. It should be appreciated that the actions associated with steps 350 and 354 for the signal diagram 300 may be substantially similar to those described with respect to steps 250 and 254 for the signal diagram 200, as discussed above.

To this end, the controller 320 may generate a set of parameters indicative of whether the smart device 310 was successfully repaired and, for each of these parameters, compare a value indicated by the received sensor data to the allowable range of the equivalent value stored in a baseline database (such as the baseline database 124 as described with respect to FIG. 1). However, unlike in the signal diagram 200, the controller may determine (358) that the repair event was unsuccessful. In particular, the controller 320 may have determined that for one or more parameters within the set of parameters, the value indicated by the sensor data is outside of the corresponding allowable range indicated by the baseline database. As part of this determination, the controller 320 may additionally check a service log to ensure that the failed parameter is not influenced and/or controlled by a component that is the subject of a future scheduled repair to the device 310.

Additionally, as described above, the controller 320 may spot check parameters outside of the set of parameters. To this end, the controller 320 may determine that the repair event is unsuccessful if one of these spot checked parameters failed the comparison between the received sensor data and the baseline database. In another scenario, the repair event may have been a scheduled maintenance. In such a scenario, if the scheduled maintenance determined that a component needs repair, then the outcome of the scheduled maintenance may still be considered "unsuccessful" even though the purpose of the scheduled maintenance may have been (at least in part) to detect such needs for repair.

In response to the controller 320 determining that the repair event was unsuccessful, the controller 320 may interface with the processing server 335 to generate (362) a recommended repair request. As part of generating the recommended repair request, the controller 320 and/or the processing server 335 may determine a preferred time for the future repair event. For example, the controller 320 and/or processing server 335 may maintain a customer profile associated with the customer 340. The customer profile may indicate that the customer 340 prefers repair work to be performed on Saturday mornings. Accordingly, the generated repair request may query the customer profile to ensure that the requested repair event occurs in accordance to the preferences of the customer 340.

Additionally, the controller 320 and/or the processing server 335 may determine a repair service provider that may perform the requested repair. To this end, the insurance provider associated with the processing server 335 may maintain a relationship with a plurality of repair service providers. In order to determine a preferred repair service provider, the controller 320 may analyze the parameters that failed the aforementioned comparison to identify a component and/or components of the smart device 310 in need of repair. Accordingly, the processing server 335 may select a repair service provider that is capable of repairing the identified component(s). If the insurance provider maintains a relationship with multiple repair service providers that are capable of repairing the identified components, the controller 320 and/or processing server 335 may select a repair service provider based upon additional criteria. For example, the controller 320 and/or processing server 335 may exclude repair service providers that are unavailable during the time period preferred by the customer 340. Similarly, the controller 320 and/or processing server 335 may exclude the repair service provider that just unsuccessfully repaired the smart device 310 (as determined by analyzing the service log and/or the received indication). According to some embodiments, after these exclusions, the controller 320 and/or processing server 335 may then select the repair service provider associated with the lowest cost of repair.

The controller 320 may compile the aforementioned time and/or repair service provider identity into a recommended repair request. According to some optional embodiments, the controller 320 may then transmit (366) the recommended repair request to the electronic device associated with the customer 340 for approval. In response, the electronic device may display an interface that enables the customer 340 to view the time, repair service provider identity, cost, and/or other similar information relating to the repair request. The interface may further enable the customer 340 to accept the recommended repair request and/or to modify any of the details associated with the repair request. Once the customer 340 accepts and/or modifies the recommended repair request, the electronic device may then transmit (370) the accepted and/or modified repair request to the controller 320. In some embodiments, the repair request received from the customer 340 may indicate a desired response to the need for repair.

According to aspects, the controller 320 and/or processing server 335 may then transmit (374) the repair request to the repair service provider. In particular, the repair request may include an identity of the smart device 310, a location of the smart device 310, an indication of a component that needs to be repaired, and/or a time that the customer prefers the smart device 310 is repaired. In some embodiments, the transmitted repair request represents and/or reflects the generated recommended repair request. In some other embodiments, the transmitted repair request represents and/or reflects the repair request as modified by the customer 340. In response to transmitting the repair request to the repair service provider, the controller 320 and/or processing server 335 may receive a confirmation that the repair service provider will perform the future scheduled repair event. In some embodiments, the controller 320 and/or processing server 335 may then forward and/or transmit a confirmation to the customer 340 describing the details of the future scheduled repair event.

Subsequent to transmitting the repair request to the repair service provider, the controller 320 may update (378) the service log associated with the smart device 310. The update may include storing a description of the unsuccessful repair event as a new past repair event and/or storing a description of the requested repair event as a new future scheduled repair event. According to aspects, storing the new past repair event may involve substantially similar actions as those described with respect to step 262 of the signal diagram 200 (excepting, of course, for describing the outcome of the repair event). It should be appreciated that in some embodiments, storing the new past repair event may occur prior to transmitting a repair request to the customer 340 and/or repair service provider. Similarly, storing the new future scheduled repair event may cause the controller 320 to store a plurality of indications describing the requested repair event, including any information contained within the repair request itself.

Additionally, after the controller 320 determines that the repair event was unsuccessful, the processing server 335 may perform (382) an insurance-related action. For example, the repair event may have further damaged the smart device 310. As a result, the value of the smart device 310 may have decreased as a result of the repair event, lowering an overall value of all property covered by an insurance policy. Accordingly, a rate and/or coverage associated with the policy may be decreased as part of the insurance-related action. In some further embodiments, the processing server 335 may perform actions associated with recovering the costs of the unsuccessful repair event via a subrogation action against a repair service provider.

According to aspects, the controller 320 may also determine that the need for the smart device 310 to receive further repairs poses substantial risks of damage to the property 305 and/or the customer 340. Accordingly, based upon analysis of the received sensor data, the controller 320 may generate and transmit (386) one or more instructions that cause the smart device 310 and/or other smart devices to perform an action to mitigate these risks. For example, a smart device may have a programmable display capable of indicating to the customer 340 that the smart device 310 is in need of repair. Similarly, the smart device 310 may be associated with an LED or other similar lighting component that indicates that the smart device 310 is in need of repair. Accordingly, the controller 320 may determine that an appropriate action is to cause the display device to display a warning to customer 340 and/or to activate the repair light associated with the smart device 310. In some scenarios, the risks associated with a defect to the smart device 310 may be of such significance that the controller 320 may determine that an appropriate action is to power off and/or de-energize the smart device 310. Upon receiving the instruction(s), the smart device 310 and/or another smart device may perform (390) the action(s) associated with the instruction(s).

It should be appreciated that signal diagram 300 may include additional, fewer, and/or alternative actions, including those discussed elsewhere herein. For example, in some embodiments, some of the actions described with respect to the controller 320 may be alternatively performed by the processing server 335 and/or the smart device 310.

III. Exemplary User Interfaces for Service Log Management

FIGS. 4A and 4B illustrate exemplary interfaces associated with alerting a customer to the outcome of a repair event. An electronic device (e.g., a smartphone or other mobile device) may be configured to display the interfaces and receive selections and inputs via the interfaces. For example, a dedicated application associated with an insurance provider and that may be configured to operate on the electronic device may display the interfaces. It should be appreciated that the interfaces are merely examples and that alternative or additional content is envisioned.

FIG. 4A illustrates an exemplary interface 400 including details relating to an unsuccessful repair event In particular, the interface 400 may indicate the repair event was unsuccessful and provide details describing a recommended action to correct the unsuccessful repair event. These details may include a name of a repair service provider capable of performing further repairs ("Repair Co."), a time frame when the repair service provider is available to perform the repair event ("Saturday morning"), a cost associated with the repair event ("$115"), and/or other details. Further, the interface 400 may enable a user to select a desired response to the failed repair event. In particular, the interface 400 may enable the user to select from accepting and/or hiring the repair service provider indicated by the interface 400, modifying the repair request indicated by the interface 400, and/or taking no action in response to the unsuccessful repair event. According to embodiments, if the user selects the interface element to modify the repair request, the electronic device may display another interface that enables the modification of repair requests. Additionally, if the user selects the interface element to take no action, an insurance provider associated with the user may perform an insurance-related action to account for the user's inaction.

FIG. 4B illustrates an interface 450 including details relating to a successful repair event. In particular, the interface 450 may indicate that a repair event occurred successfully and/or display an appropriate icon. The interface 450 may provide an interface element that enables a user to view additional details associated with the repair event, for example, an identity of the repair service provider, an identity of a component that was repaired, and/or the like. Additionally, the interface 450 may provide an interface element to enable the user to dismiss the notification. The exemplary interfaces 400 and 450 may include additional, less, or alternate functionality, including functionality described elsewhere herein.

IV. Exemplary Methods for Service Log Management

Figure 5:
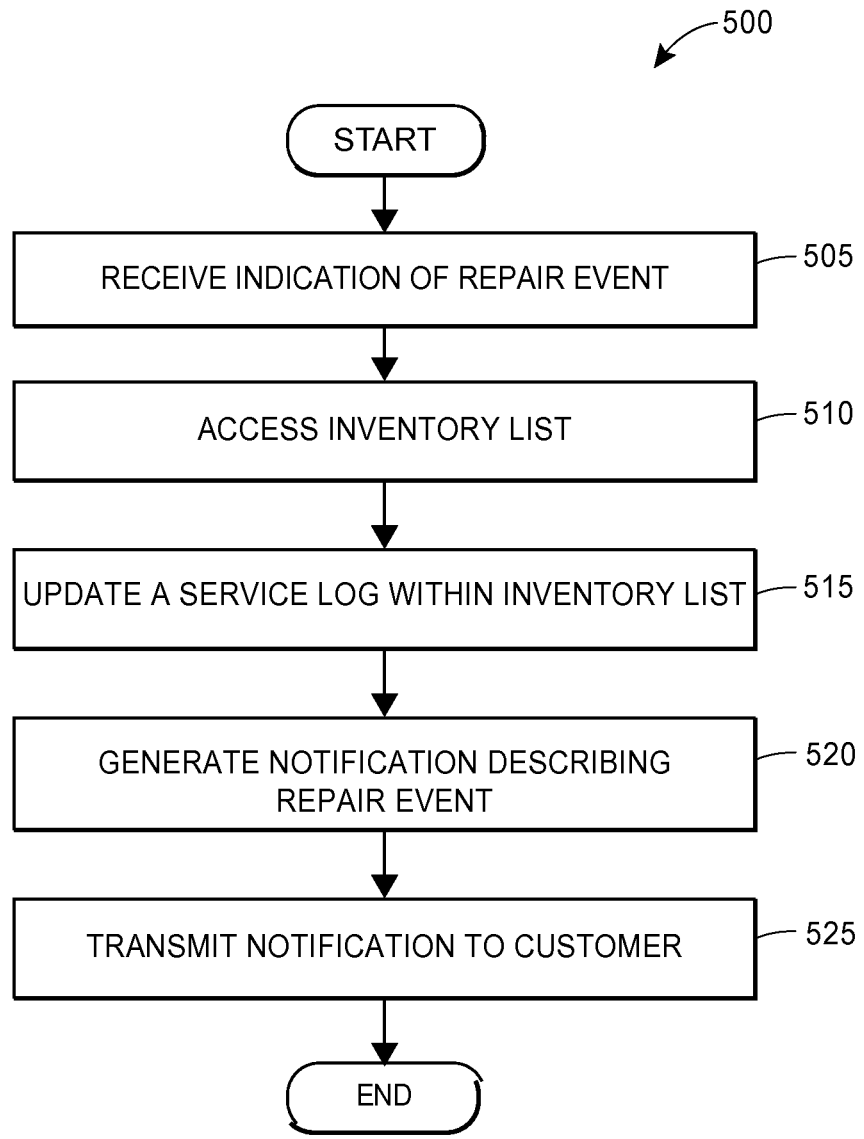
FIG. 5 depicts an exemplary flow diagram associated with managing repair status, in accordance with some embodiments.

Referring to FIG. 5, depicted is a block diagram of an exemplary method 500 of managing service logs for a plurality of devices, such as any of the smart devices 110 as described with respect to FIG. 1. The method 500 may be facilitated by an electronic device within the property, such as the controller 120, that may be in direct or indirect communication with an insurance provider (such as the insurance provider 130 or a remote processor or server thereof). In some implementations, the controller may store and maintain a digital inventory list of devices disposed on the property.

The method 500 may begin when the controller receives (block 505) an indication that a device on the premises of the property has undergone a repair event. The indication may include information describing the repair event and/or sensor data indicative of the operation of the device after the repair event has concluded. Upon receiving the indication, the controller may determine an identity of the device that has undergone the repair event. After determining the identity of the device that underwent the repair event, the controller may access (block 510) the inventory list and/or a database of baseline performance data to analyze data related to the device. In particular, the controller may access the inventory list to access and/or analyze a service log corresponding to the identified device. In some embodiments, the controller may compare the sensor data to the accessed data to determine an outcome of the repair event.

Upon determining the outcome of the repair event, the controller may then update (block 515) the service log to indicate the determined outcome. For example, the service log may contain a list of past repair events and/or future scheduled repair events. The controller may then update the list of past repair events to include information relating to the detected repair event (such as the determined outcome). Additionally, if the controller determined that the repair event was unsuccessful, the controller may automatically schedule and/or update the list of future scheduled repair events to indicate that a follow-up repair event has been scheduled.

Subsequent to updating the service log, the controller may then generate (block 520) a notification to the customer describing the outcome of the detected repair event and/or other indications describing the detected repair event. If the repair event was unsuccessful, the notification may also include a proposed and/or recommended follow-up repair request to correct any additional repair needs arising from the repair event. The controller may then transmit (block 525) the notification to an electronic device associated. More particularly, the electronic device may be a mobile device, such as a smartphone, belonging to the owner and/or occupant of the property and/or a policyholder of an insurance policy covering the device. In some scenarios, the controller may additionally communicate the notification to the insurance provider. In response to receiving the notification, the insurance provider may perform an insurance-related action to reflect changes in the value and/or risks associated with the device.

In some scenarios in which the detected repair event was unsuccessful, the controller may additionally receive a repair request from the electronic device. In response, the controller may transmit and/or forward the repair request to a repair service provider indicated in the repair request. It should be further appreciated that method 500 may include additional, fewer, and/or alternative actions, including those discussed elsewhere herein.

V. Exemplary Service Log Management Method

In one aspect, a computer-implemented method of managing an insurance policy associated with a property may be provided. The property may be populated with a hardware controller in communication with the plurality of devices and each of the plurality of devices may be respectively covered by a warranty. The method may include (1) receiving, by the hardware controller via a first communication network, an indication that a particular device of the plurality of devices has undergone a repair event; (2) accessing, by one or more processors, an inventory list associated with the property, the inventory list indicating the plurality of devices and including a service log for each of the plurality of devices, wherein the service log indicates at least one of a set of past repair events and/or a set of future scheduled repair events for the respective device of the plurality of devices; (3) based upon the indication, updating, by the one or more processors, the service log associated with the particular device to indicate that the particular device has undergone the repair event; (4) generating, by the one or more processors, a notification including a description of the repair event; and/or (5) transmitting, to a customer associated with the insurance policy via a second communication network, the notification to facilitate customer awareness of the repair event. The method may include additional, less, or alternate actions, including those discussed elsewhere herein, and/or may be implemented via one or more local or remote processors (such as smart home controllers, smart devices, mobile devices, and/or insurance provider remote servers), and/or computer-executable instructions stored on non-transitory computer-readable medium or media.

For instance, the receiving of the indication that the particular device has undergone the repair event may include receiving, from the particular device, the indication that the particular device has been repaired, wherein the indication indicates that the particular device automatically detected the occurrence of the repair event.

Receiving the indication that the particular device has undergone the repair event may include receiving, by the hardware controller, the indication that the particular device has undergone the repair, wherein the indication includes a portion of the description of the repair event, and wherein the description of the repair event comprises at least one of an identity of the particular device, a location of the particular device, a time the repair event occurred, an identity of an entity performing the repair event, and/or an indication of a component that was repaired during the repair event.

Updating the service log to indicate that the particular device has undergone the repair event may include storing, by the one or more processors, a new past repair event in the service log corresponding to the particular device, wherein the new past repair event indicates at least a portion of the description of the repair event.

Receiving the indication that the particular device has undergone the repair event may include (1) after the repair event is concluded, receiving, from the particular device, sensor data indicative of an operational state of the particular device; (2) comparing, by the one or more processors, the sensor data to baseline data; and/or (3) based upon the comparison, determining, by the one or more processors, an outcome of the repair event, wherein the outcome indicates whether the repair event successfully or unsuccessfully repaired the particular device.

When the outcome of the repair event indicates that the repair event was unsuccessful, transmitting the notification may include (1) transmitting, to an electronic device associated with the customer, a recommended repair request, wherein transmitting causes the electronic device to display a recommended repair request; (2) receiving, from the electronic device, an indication of a request to schedule a new repair event to the particular device; and/or (3) based upon the request to schedule a new repair event, updating, by the one or more processors, the service log corresponding to the particular device to indicate a new future scheduled repair event.

In response to receiving the request to schedule a new repair event, the method may include transmitting, to a repair service provider, a repair request, wherein the repair request comprises at least one of an identity of the particular device, a location of the particular device, an indication of a component that needs to be repaired, and/or a time the customer prefers the particular device is repaired.

When the outcome of the repair event indicates that the repair event was unsuccessful, the method may include transmitting, via the first communication network, an instruction to the particular device, wherein transmitting the instruction causes the particular device to perform at least one of powering off, de-energizing, and/or providing a visual indication that the particular device needs to be repaired. When the outcome of the repair event indicates that the repair event was successful, transmitting the notification may include transmitting, to an electronic device associated with the customer, an indication that the particular device was successfully repaired, wherein transmitting the indication causes the electronic device to display an interface that enables the customer to view a portion of the description of the repair event. Transmitting the notification may include transmitting, to an insurance provider (and/or insurance provider remote server or processor) associated with the insurance policy via the second communication network, the notification, wherein transmitting the notification causes the insurance provider to perform an insurance-related activity.

VI. Exemplary Service Log Management System

In one aspect, a system for managing an insurance policy associated with a property may be provided. The property may be populated with a hardware controller in communication with the plurality of devices and each of the plurality of devices respectively may be covered by a warranty. The system may include (i) a plurality of transceivers adapted to communicate data; (ii) a memory adapted to store non-transitory computer executable instructions; and/or (iii) one or more processors adapted to interface with the plurality of transceivers. The one or more processors may be configured to execute the non-transitory computer executable instructions to cause the system to (1) receive, at the plurality of transceivers, an indication that a particular device of the plurality of devices has undergone a repair event; (2) access, by the one or more processors, an inventory list associated with the property, the inventory list indicating the plurality of devices and including a service log for each of the plurality of devices, wherein the service log indicates at least one of a set of past repair events and/or a set of future scheduled repair events for the respective device of the plurality of devices; (3) based upon the indication, update, by the one or more processors, the service log associated with the particular device to indicate that the particular device has undergone the repair event; (4) generate, by the one or more processors, a notification including a description of the repair event; and/or (5) transmit, to a customer associated with the insurance policy via the plurality of transceivers, the notification to facilitate customer awareness of the repair event. The system may include additional, less, or alternate functionality, including that discussed elsewhere herein.

For instance, to receive the indication that the particular device has undergone the repair event, the plurality of transceivers may be further configured to receive, from the particular device, the indication that the particular device has been repaired, wherein the indication indicates that the particular device automatically detected the occurrence of the repair event.

To update the service log to indicate that the particular device has undergone the repair event, the one or more processors may be further configured to execute the non-transitory computer executable instructions to cause the system to store, by the one or more processors, a new past repair event in the service log corresponding to the particular device, wherein the new past repair event indicates at least a portion of the description of the repair event.

To receive the indication that the particular device has undergone the repair event, the one or more processors may be further configured to execute the non-transitory computer executable instructions to cause the system to (1) after the repair event is concluded, receive, from the particular device by the plurality of transceivers, sensor data indicative of an operational state of the particular device; (2) compare, by the one or more processors, the sensor data to baseline data; and/or (3) based upon the comparison, determine, by the one or more processors, an outcome of the repair event, wherein the outcome indicates whether the repair event successfully or unsuccessfully repaired the particular device.

When the outcome of the repair event indicates that the repair event was unsuccessful, the one or more processors may be further configured to execute the non-transitory computer executable instructions to cause the system to (1) transmit, to an electronic device associated with the customer via the plurality of transceivers, a recommended repair request, wherein transmitting causes the electronic device to display a recommended repair request; (2) receive, from the electronic device by the plurality of transceivers, an indication of a request to schedule a new repair event to the particular device; and/or (3) based upon the request to schedule a new repair event, update, by the one or more processors, the service log corresponding to the particular device to indicate a new future scheduled repair event.

In response to receiving the request to schedule a new repair event, the plurality of transceivers may be further configured to transmit, to a repair service provider, a repair request, wherein the repair request comprises at least one of an identity of the particular device, a location of the particular device, an indication of a component that needs to be repaired, and/or a time the customer prefers the particular device is repaired.

When the outcome of the repair event indicates that the repair event was unsuccessful, the plurality of transceivers may be further configured to transmit, via the first communication network, an instruction to the particular device, wherein transmitting the instruction causes the particular device to perform at least one of powering off, de-energizing, and/or providing a visual indication that the particular device needs to be repaired. When the outcome of the repair event indicates that the repair event was successful, the plurality of transceivers may be further configured to transmit, to an electronic device associated with the customer, an indication that the particular device was successfully repaired, wherein transmitting the indication causes the electronic device to display an interface that enables the customer to view a portion of the description of the repair event. To transmit the notification, the plurality of transceivers may be further configured to transmit, to an insurance provider associated with the insurance policy via the second communication network, the notification, wherein transmitting the notification causes the insurance provider to perform an insurance-related activity.

VII. Exemplary Controller

Figure 6:
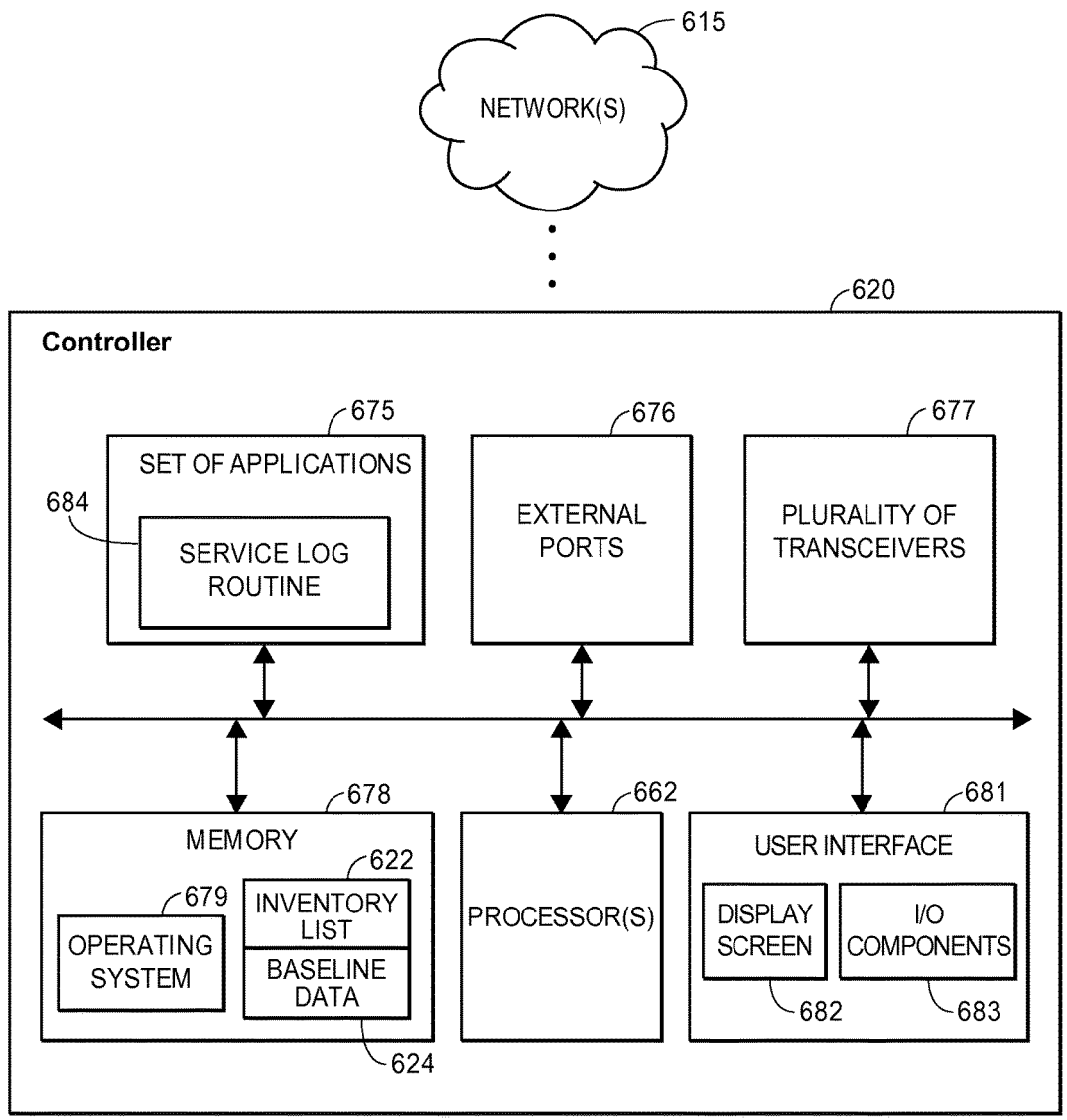
FIG. 6 is a block diagram of an exemplary controller, in accordance with some embodiments.

FIG. 6 illustrates a diagram of an exemplary smart home controller 620 (such as the smart home controller 120 as discussed with respect to FIG. 1) in which the functionalities as discussed herein may be implemented. The controller 620 may be a smart or interconnected home controller. It should be appreciated that the smart home controller 620 may be associated with a property, as discussed elsewhere herein.

The controller 620 may include a processor 662, as well as a memory 678. The memory 678 may store an operating system 679 capable of facilitating the functionalities as described herein. The controller 620 may also store a set of applications 675 (i.e., machine readable instructions). For example, the set of applications 675 may include a service log routine 684 configured monitor and/or maintain up-to-date records describing past repair events and/or future scheduled repair events associated with a property. It should be appreciated that other applications are envisioned.

The processor 662 may interface with the memory 678 to execute the operating system 679 and the set of applications 675. According to some embodiments, the memory 678 may also include inventory list 622 that includes information (such as service logs) related to the plurality of smart devices on the premises of the property and baseline data 624 that describes the normal operation of the devices located on the premises of the property. The service log routine 684 may access the inventory list 622 to manage service logs associated with smart devices. Additionally, the service log routine 684 may access the baseline data 624 to determine an outcome of a repair event. The memory 678 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The controller 620 may further include a plurality of transceivers 677 configured to communicate data via one or more networks 615. Network(s) 615 may include both a local network for communicating between devices mounted on, or proximate to, the property and a remote network for communicating between the property and external parties. According to some embodiments, the plurality of transceivers 677 may include one or more transceivers (e.g., WWAN, WLAN, and/or WPAN transceivers) functioning in accordance with IEEE standards, 3GPP standards, or other standards, and configured to receive and transmit data via one or more external ports 676. In some embodiments, the plurality of transceivers 677 may include separate transceivers configured to interact with the local and remote networks separately. The controller 620 may further include a user interface 681 configured to present information to a user and/or receive inputs from the user. As shown in FIG. 6, the user interface 681 may include a display screen 682 and I/O components 683 (e.g., ports, capacitive or resistive touch sensitive input panels, keys, buttons, lights, LEDs, speakers, microphones).

According to the present embodiments, the user may access the controller 620 via the user interface 681 to monitor the status of the plurality of smart devices associated with a property, update the inventory list 622 including the plurality of smart devices associated with the property, and/or perform other functions. In some embodiments, the controller 620 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code is adapted to be executed by the processor 662 (e.g., working in connection with the operating system 679) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources. It should be appreciated that the controller 620 may include additional, less, or alternate components, including those discussed elsewhere herein.

VIII. Additional Embodiments

The present embodiments may relate to, inter alia, managing operation of devices or personal property within a home or other type of property, such as household furniture, appliances, electronics, vehicles (e.g., cars, boats, motorcycles), and/or other personal belongings (e.g., clothing, jewelry, antiques). Generally, a home or property may have a "smart" central controller that may be wirelessly connected, or connected via hard-wire, with various household related items, devices, and/or sensors. The central controller may be associated with any type of property, such as homes, office buildings, restaurants, farms, and/or other types of properties.

The central controller, and/or one or more remote processors or servers associated with an insurance provider, may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (or sensor associated therewith), as well as the central controller and/or insurance provider remote processor(s), may be equipped with a processor, memory unit, software applications, wireless transceivers, local power supply, various types of sensors, and/or other components.

The central controller, and/or insurance provider remote processor(s), may collect or retrieve various data from the devices or personal property, analyze the data, and/or identify various actions to facilitate based upon the analysis. In particular, the central controller, and/or insurance provider remote processor(s), may issue commands to the devices or otherwise control operation of the devices. Upon receipt, the appropriate device may execute the command(s) to cause the smart device to perform an action or enter a preferred operation state. The central controller, and/or insurance provider remote processor(s), may also generate notifications of various operation states or completed actions, and communicate the notifications to individuals associated with the property.

Generally, the systems and methods offer numerous benefits to operation of devices within the property, as well as to individuals associated with the property. In particular, the systems and methods may automatically detect potential or actual issues with the property that the individuals may not realize exist, and may automatically facilitate preventative or corrective actions to address the issues. As a result, security associated with the property may improve. Further, the systems and methods improve loss prevention and mitigate actual loss. The systems and methods further apply to independent and/or assisted living situations, whereby patients may receive improved care and individuals associated with the patients may realize more effective communication. Additionally, the systems and methods may improve energy consumption.

The systems and methods may further offer a benefit to insurance providers and customers thereof. Particularly, the present embodiments may facilitate (a) providing and updating insurance policies; (b) the handling or adjusting of home insurance claims; (c) the disbursement of monies related to insurance claims; (d) modifying insurance coverage amounts; (e) updating and improving damage estimate models, and/or (f) other insurance-related activities. The systems and methods may further offer a benefit to customers by offering improved insurance claim processing. Further, the insurance providers may stand out as a cost-effective insurance provider, thereby retaining existing customers and attracting new customers. It should be appreciated that further benefits to the systems and methods are envisioned.

The method may also include adjusting an insurance policy, premium, or discount (such as a homeowners, renters, auto, home, health, or life insurance policy, premium, or discount) based upon the warranty and/or building code, and/or other functionality discussed herein, and/or an insured having a home and/or mobile device with such functionality.

In some embodiments, the wired or wireless communication or data transmission, and/or data, received and/or analyzed by the smart home controller or remote processor may indicate an age of an appliance. In response, and/or based upon the analysis by the smart home controller or remote processor of the wired or wireless communication or data transmission, and/or data received, the smart home controller or remote processor may (1) determine that the appliance needs to be repaired or replaced (such as by determining that the appliance's warranty is about to expire or has expired), and/or (2) generate a recommendation to the insured that the appliance should be either repaired or replaced (e.g., the smart home controller or remote processor may determine that it is more cost effective to replace an old appliance with a new appliance (having a new warranty) than it is to repair the old appliance (having an expired or expiring warranty)).

The wired or wireless communication or data transmission, and/or data, received and/or analyzed by the smart home controller or remote processor may indicate that an item (fire extinguisher, emergency kit for vehicles, etc.) is about to go out of warranty. In response, and/or based upon the analysis by the smart home controller or remote processor of the wired or wireless communication or data transmission, and/or data received, the smart home controller or remote processor may determine an appropriate replacement item, and order and then direct the delivery of the replacement item to the insured home.

The wired or wireless communication or data transmission, and/or data, received and/or analyzed by the smart home controller or remote processor may further indicate that a piece of home equipment (refrigerator, air conditioning unit, furnace, stove, water heater, dish washer, clothes washer or dryer, vent, damper, air exhaust or air flow, clothes dryer exhaust, etc.) is not working properly. In response, and/or based upon the analysis by the smart home controller or remote processor of the wired or wireless communication or data transmission, and/or data received, the smart home controller or remote processor may de-energize or shut off the piece of home equipment, and generate and transmit a corresponding electronic message or wireless communication notifying the insured of such (i.e., that the piece of home equipment is not working properly and/or has been automatically shut off). The wired or wireless communication or data transmission, and/or data may be transmitted from a smart sensor or device (or associated transmitter) attached to the piece of home equipment, and the smart sensor or device may further have a visual indication (e.g., LED light) that illuminates or blinks when the piece of home equipment is not working properly.

The wired or wireless communication or data transmission, and/or data, received and/or analyzed by the smart home controller or remote processor may indicate that a piece of home equipment is not working properly from analysis of water or air flow. In response, and/or based upon the analysis by the smart home controller or remote processor of the wired or wireless communication or data transmission, and/or data received, the smart home controller or remote processor may de-energize or shut off the piece of home equipment, and/or generate and transmit a corresponding electronic message or wireless communication notifying the insured of such (i.e., that the piece of home equipment is not working properly and/or has been automatically shut off). The air flow may be associated with an air conditioning unit, furnace, ventilation system, or clothes dryer exhaust, and the smart home controller or remote processor may determine that the air flow is abnormal and/or lower than expected (indicating potential or actual blockage, leakage, or dust or lint buildup). The water flow may be associated with a clothes washer, dish washer, refrigerator, or toilet, and the smart home controller or remote processor may determine that the water flow is abnormal and/or higher than expected (indicating a potential or actual leak, or blockage).

The smart home controller or remote processor may be configured to build a service log for items within the insured home from computer analysis of the data received (such as by employing object recognition and/or optical character recognition techniques, or receiving electronic records of service performed and/or receipts of items bought) by the smart home controller or remote processor. The service log built by the smart home controller or remote processor may include information associated with repairs completed on items within the insured home, scheduled maintenance for items within the insured home, all purchases and purchase dates/prices of items within the insured home, and/or warranty information of items within the home, such as appliances, electronics, plumbing or electrical equipment, air conditioning units, furnaces, water heaters, roofing, flooring, or other items.

IX. Additional Considerations

As generally used herein, the terms "repair" and "service" may be used interchangeably in all contexts. Accordingly, the use of the word "repair" does not require a smart device to be broken and/or defective. In some embodiments, the word "repair" may refer to a scheduled maintenance, a check-up, or any other event requiring a manual investigation of a smart device. Similarly, as used herein, the phrase "repair service provider" refers to an entity capable of performing the required repair and/or maintenance need as determined by a central controller. To this end, as used herein, the phrase "repair event" refers to the performance of the repair and/or maintenance by the repair service provider.

As used herein, the term "smart" may refer to devices, sensors, or appliances located within or proximate to a property, and with the ability to communicate information about the status of the device, sensor, or appliance and/or receive instructions that control the operation of the device, sensor, or appliance, such as via wired or wireless communication or data transmissions. For example, a smart thermostat may be able to remotely communicate the current temperature of the home and receive instructions to adjust the temperature to a new level. As another example, a smart water tank may be able to remotely communicate the water level contained therein and receive instructions to restrict the flow of water leaving the tank. In contrast, "dumb" devices, sensors, or appliances located within or proximate to a property may require manual control. Referring again to the thermostat example, to adjust the temperature on a "dumb" thermostat, a person may have to manually interact with the thermostat. As such, a person may be unable to use a communication network to remotely adjust a "dumb" device, sensor, or appliance.

A "smart device" as used herein may refer to any of a smart device, sensor, appliance, and/or other smart equipment that may be located on the premises of a property. In some embodiments in which an appliance and a sensor external to the particular appliance are associated with each other, "smart device" may refer to both the external sensors and the appliance collectively. Some examples of devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. Similarly, an individual associated with the property shall be referred to as the "homeowner," "property owner," or "policyholder," but it is also envisioned that the individual may be a family member of the homeowner, a person renting/subletting the property, a person living or working on the property, a neighbor of the property, or any other individual that may have an interest in preventing or mitigating damage to the property.

Further, any reference to "home" or "property" is meant to be exemplary and not limiting. The systems and methods described herein may be applied to any property, such as homes, offices, farms, lots, parks, apartments, condos, and/or other types of properties or buildings. Accordingly, "homeowner" may be used interchangeably with "property owner."

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to smart home functionality (or service log or repair event functionality), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, appliances or other equipment, or vehicles, and/or (ii) home or apartment occupants.

It should be understood that the smart devices may be considered specific-purpose computers designed to perform specific tasks. For example, a smart window may comprise a processor specifically configured to monitor one or more networks for remotely-generated instructions to cause the smart window to open and/or close. The processor may additionally be specifically programmed to interpret the instructions to generate another instruction to cause a motor component corresponding to the smart window to physically open and/or close the smart window. In addition to the execution of instructions, the processor may also be specifically configured to monitor conditions associated with the smart window and to transmit said conditions via one or more networks. To this end, the processor corresponding to a smart device may be configured solely to perform specific actions indicated by received instructions and to communicate specific conditions associated with the smart device. Accordingly, the processor corresponding to the smart device may not be configurable to perform additional and/or alternative general-purpose functions associated with general-purpose computers. It should be understood that since the present application contemplates a variety of different smart devices, the specific-purpose of each processor may vary between and among the smart devices.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for example, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), and other types of insurance products. In embodiments as described herein, the insurance providers process claims related to insurance policies that cover one or more properties (e.g., homes, automobiles, personal property), although processing other insurance policies may also be envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of managing an insurance policy associated with a property, the property populated with a hardware controller in communication with a plurality of devices, each of the plurality of devices configured to monitor various conditions associated with the property, the method comprising:
    receiving via wireless communication, by the hardware controller via a first communication network, an indication that a particular device of the plurality of devices has undergone a repair event, the indication including information describing the repair event and sensor data indicative of the operation of the device after the repair event has concluded;
    accessing, by one or more processors, an inventory list associated with the property, the inventory list indicating the plurality of devices and including a service log for each of the plurality of devices, wherein the service log indicates at least one of a set of past repair events or a set of future scheduled repair events for the respective device of the plurality of devices;
    based upon the indication, updating, by the one or more processors, the service log associated with the particular device to indicate that the particular device has undergone the repair event;
    generating, by the one or more processors, a notification including a description of the repair event; and
    transmitting via wireless communication, to a mobile device of a customer associated with the insurance policy via a second communication network, the notification to facilitate customer awareness of the repair event.

2. The computer-implemented method of claim 1, wherein receiving the indication that the particular device has undergone the repair event further comprises:
    receiving via wireless communication, from the particular device, the indication that the particular device has been repaired; wherein the indication indicates that the particular device automatically detected the occurrence of the repair event.

3. The computer-implemented method of claim 1, wherein receiving the indication that the particular device has undergone the repair event further comprises:
    receiving, by the hardware controller, the indication that the particular device has undergone the repair, wherein the indication includes a portion of the description of the repair event, and wherein the description of the repair event comprises at least one of an identity of the particular device, a location of the particular device, an identity of an entity performing the repair event, and an indication of a component that was repaired during the repair event.

4. The computer-implemented method of claim 1, wherein updating the service log to indicate that the particular device has undergone the repair event further comprises:
    storing, by the one or more processors, a new past repair event in the service log corresponding to the particular device, wherein the new past repair event indicates at least a portion of the description of the repair event.

5. The computer-implemented method of claim 1, wherein receiving the indication that the particular device has undergone the repair event further comprises:
    after the repair event is concluded, receiving, from the particular device via wireless communication, sensor data indicative of an operational state of the particular device;
    comparing, by the one or more processors, the sensor data to baseline data; and
    based upon the comparison, determining, by the one or more processors, an outcome of the repair event, wherein the outcome indicates whether the repair event successfully or unsuccessfully repaired the particular device.

6. The computer-implemented method of claim 5, wherein when the outcome of the repair event indicates that the repair event was unsuccessful, transmitting the notification further comprises:
    transmitting, to an electronic device associated with the customer, a recommended repair request, wherein transmitting causes the electronic device to display a recommended repair request;
    receiving, from the electronic device, an indication of a request to schedule a new repair event to the particular device; and
    based upon the request to schedule a new repair event, updating, by the one or more processors, the service log corresponding to the particular device to indicate a new future scheduled repair event.

7. The computer-implemented method of claim 6, further comprising:
    in response to receiving the request to schedule a new repair event, transmitting, to a repair service provider, a repair request, wherein the repair request comprises at least one of an identity of the particular device, a location of the particular device, an indication of a component that needs to be repaired, or a time the customer prefers the particular device is repaired.

8. The computer-implemented method of claim 5, wherein when the outcome of the repair event indicates that the repair event was unsuccessful, the method further comprises:
transmitting, via the first communication network, an instruction to the particular device, wherein transmitting the instruction causes the particular device to perform at least one of powering off, de-energizing, or providing a visual indication that the particular device needs to be repaired.

9. The computer-implemented method of claim 5, wherein when the outcome of the repair event indicates that the repair event was successful; transmitting the notification further comprises:
transmitting, to an electronic device associated with the customer, an indication that the particular device was successfully repaired, wherein transmitting the indication causes the electronic device to display an interface that enables the customer to view a portion of the description of the repair event.

10. The computer-implemented method of claim 1, wherein transmitting the notification further comprises:
transmitting, to an insurance provider associated with the insurance policy via the second communication network, the notification, wherein transmitting the notification causes the insurance provider to perform an insurance-related activity.

11. A system for managing an insurance policy associated with a property, the property populated with a hardware controller in communication with the plurality of devices, each of the plurality of devices respectively covered by a warranty, the system comprising:
a plurality of transceivers adapted to communicate data;
a memory adapted to store non-transitory computer executable instructions; and
one or more processors adapted to interface with the plurality of transceivers, wherein the one or more processors are configured to execute the non-transitory computer executable instructions to cause the system to:
receive via wireless communication, at the plurality of transceivers, an indication that a particular device of the plurality of devices has undergone a repair event, the indication including information describing the repair event and sensor data indicative of the operation of the device after the repair event has concluded;
access, by the one or more processors, an inventory list associated with the property, the inventory list indicating the plurality of devices and including a service log for each of the plurality of devices, wherein the service log indicates at least one of a set of past repair events or a set of future scheduled repair events for the respective device of the plurality of devices;
based upon the indication, update, by the one or more processors, the service log associated with the particular device to indicate that the particular device has undergone the repair event;
generate, by the one or more processors, a notification including a description of the repair event; and
transmit via wireless communication, to a mobile device of a customer associated with the insurance policy via the plurality of transceivers, the notification to facilitate customer awareness of the repair event.

12. The system of claim 11, wherein to receive the indication that the particular device has undergone the repair event, the plurality of transceivers are further configured to:
receive, from the particular device, the indication that the particular device has been repaired, wherein the indication indicates that the particular device automatically detected the occurrence of the repair event.

13. The system of claim 11, wherein to update the service log to indicate that the particular device has undergone the repair event, the one or more processors are further configured to execute the non-transitory computer executable instructions to cause the system to:
store, by the one or more processors, a new past repair event in the service log corresponding to the particular device, wherein the new past repair event indicates at least a portion of the description of the repair event.

14. The system of claim 11, wherein to receive the indication that the particular device has undergone the repair event, the one or more processors are further configured to execute the non-transitory computer executable instructions to cause the system to:
after the repair event is concluded, receive, from the particular device by the plurality of transceivers, sensor data indicative of an operational state of the particular device;
compare, by the one or more processors, the sensor data to baseline data; and
based upon the comparison, determine, by the one or more processors, an outcome of the repair event, wherein the outcome indicates whether the repair event successfully or unsuccessfully repaired the particular device.

15. The system of claim 14, wherein when the outcome of the repair event indicates that the repair event was unsuccessful, the one or more processors are further configured to execute the non-transitory computer executable instructions to cause the system to:
transmit, to an electronic device associated with the customer via the plurality of transceivers, a recommended repair request, wherein transmitting causes the electronic device to display a recommended repair request;
receive, from the electronic device by the plurality of transceivers, an indication of a request to schedule a new repair event to the particular device; and
based upon the request to schedule a new repair event, update, by the one or more processors, the service log corresponding to the particular device to indicate a new future scheduled repair event.

16. The system of claim 15, wherein the plurality of transceivers are further configured to:
in response to receiving the request to schedule a new repair event, transmit, to a repair service provider, a repair request, wherein the repair request comprises at least one of an identity of the particular device, a location of the particular device, an indication of a component that needs to be repaired, or a time the customer prefers the particular device is repaired.

17. The system of claim 16, wherein when the outcome of the repair event indicates that the repair event was unsuccessful, the plurality of transceivers are further configured to:
transmit, via the first communication network, an instruction to the particular device, wherein transmitting the instruction causes the particular device to perform at least one of powering off, de-energizing, or providing a visual indication that the particular device needs to be repaired.

18. The system of claim 14, wherein when the outcome of the repair event indicates that the repair event was successful, the plurality of transceivers are further configured to:

transmit, to an electronic device associated with the customer, an indication that the particular device was successfully repaired, wherein transmitting the indication causes the electronic device to display an interface that enables the customer to view a portion of the description of the repair event.

19. The computer-implemented method of claim 11, wherein to transmit the notification, the plurality of transceivers are further configured to:

transmit, to an insurance provider associated with the insurance policy via the second communication network, the notification, wherein transmitting the notification causes the insurance provider to perform an insurance-related activity.

20. A non-transitory computer-readable storage medium storing processor-executable instructions, that when executed cause one or more processors to:

receive via wireless communication, by one or more processors, an indication that a particular device of the plurality of devices has undergone a repair event the indication including information describing the repair event and sensor data indicative of the operation of the device after the repair event has concluded;

access, by the one or more processors, an inventory list associated with the property, the inventory list indicating the plurality of devices and including a service log for each of the plurality of devices, wherein the service log indicates at least one of a set of past repair events or a set of future scheduled repair events for the respective device of the plurality of devices;

based upon the indication, update, by the one or more processors, the service log associated with the particular device to indicate that the particular device has undergone the repair event;

generate, by the one or more processors, a notification including a description of the repair event; and transmit via wireless communication, to a mobile device of a customer associated with the insurance policy via a remote communication network, the notification to facilitate customer awareness of the repair event.

\* \* \* \* \*